United States Patent
Kato et al.

(10) Patent No.: US 10,279,794 B2
(45) Date of Patent: May 7, 2019

(54) HYBRID VEHICLE

(71) Applicant: Toyota Jidosha Kabushiki Kaisha, Toyota-shi, Aichi-ken (JP)

(72) Inventors: Shunya Kato, Seto (JP); Masaya Sugai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 95 days.

(21) Appl. No.: 15/595,301

(22) Filed: May 15, 2017

(65) Prior Publication Data

US 2017/0334420 A1 Nov. 23, 2017

(30) Foreign Application Priority Data

May 18, 2016 (JP) ................................. 2016-099384

(51) Int. Cl.
*B60W 20/30* (2016.01)
*B60W 10/08* (2006.01)
(Continued)

(52) U.S. Cl.
CPC ............. *B60W 10/08* (2013.01); *B60K 6/365* (2013.01); *B60K 6/445* (2013.01); *B60K 6/547* (2013.01);
(Continued)

(58) Field of Classification Search
CPC .......... B60K 6/48; B60K 6/445; B60K 6/547; B60K 6/365; B60W 20/00; B60W 20/10;
(Continued)

(56) References Cited

U.S. PATENT DOCUMENTS 7,460,943 B2 * 12/2008 Yamamoto ............. B60K 6/445
701/52
7,559,871 B2 * 7/2009 Amano .................. B60K 6/365
180/65.28
(Continued)

FOREIGN PATENT DOCUMENTS

JP 2003-204606 A 7/2003
JP 2008-074328 A 4/2008
(Continued)

OTHER PUBLICATIONS

U.S. Appl. No. 15/450,196, filed Mar. 6, 2017 Inventors: Shunya Kato, Ikuo Ando, Naoki Ishikawa, Tooru Matsubara, Munehiro Katsumata, Masaya Sugai.

*Primary Examiner* — Leslie A Nicholson, III
(74) *Attorney, Agent, or Firm* — Dinsmore & Shohl LLP

(57) ABSTRACT

A hybrid vehicle includes an engine, a first motor, a planetary gear mechanism, a second motor, a battery, and an electronic control unit. The electronic control unit is configured to: control the engine, the first motor, and the second motor such that the hybrid vehicle travels using a required driving force; set a target rotation speed on a basis of the depression amount of the accelerator pedal, the vehicle speed, and a shift stage such that the target rotation speed of the engine increases as the depression amount of the accelerator pedal increases; set an upper-limit driving force; and control the engine, the first motor, and the second motor such that the engine operates at the target rotation speed and the smaller driving force of the upper-limit driving force and the required driving force is output to the drive shaft.

8 Claims, 13 Drawing Sheets

(51) Int. Cl.
| | |
|---|---|
| *B60K 6/365* | (2007.10) |
| *B60K 6/445* | (2007.10) |
| *B60W 20/00* | (2016.01) |
| *B60W 50/10* | (2012.01) |
| *B60K 6/547* | (2007.10) |
| *B60W 10/06* | (2006.01) |
| *B60W 10/11* | (2012.01) |
| *B60W 30/188* | (2012.01) |
| *B60W 20/10* | (2016.01) |
| *B60K 6/48* | (2007.10) |
| *B60W 10/04* | (2006.01) |

(52) U.S. Cl.
CPC ............ *B60W 10/06* (2013.01); *B60W 10/11* (2013.01); *B60W 20/00* (2013.01); *B60W 20/10* (2013.01); *B60W 20/30* (2013.01); *B60W 30/1882* (2013.01); *B60W 50/10* (2013.01); *B60K 6/48* (2013.01); *B60W 10/04* (2013.01); *B60W 2510/244* (2013.01); *B60W 2520/10* (2013.01); *B60W 2540/10* (2013.01); *B60W 2540/16* (2013.01); *B60W 2710/0644* (2013.01); *B60W 2710/0666* (2013.01); *B60W 2710/083* (2013.01); *Y02T 10/6239* (2013.01); *Y02T 10/6286* (2013.01); *Y02T 10/7258* (2013.01)

(58) Field of Classification Search
CPC ...... B60W 20/30; B60W 10/06; B60W 10/08; B60W 10/11; B60W 10/115; B60W 30/1882; B60W 50/10; B60W 50/085; B60W 2520/10; B60W 2510/24; B60W 2510/246; B60W 2710/0644; B60W 2710/0666; B60W 2710/083
USPC .......................................................... 475/5
See application file for complete search history.

(56) References Cited

U.S. PATENT DOCUMENTS

| | | | | |
|---|---|---|---|---|
| 7,921,943 | B2* | 4/2011 | Ueoka .................... | B60K 6/365 180/65.21 |
| 7,971,668 | B2* | 7/2011 | Ando ..................... | B60K 6/445 180/65.265 |
| 8,170,736 | B2* | 5/2012 | Muta ..................... | B60W 10/06 180/65.1 |
| 8,177,005 | B2* | 5/2012 | Yamanaka ............. | B60K 6/445 180/65.28 |
| 8,634,978 | B2* | 1/2014 | Matsubara ............ | B60W 30/14 701/22 |
| 8,930,101 | B2* | 1/2015 | Otsubo .................. | B60K 6/365 701/55 |
| 9,026,293 | B2* | 5/2015 | Ito ......................... | B60W 20/13 180/65.265 |
| 9,994,214 | B2* | 6/2018 | Kato ...................... | B60K 6/543 |
| 10,046,755 | B2* | 8/2018 | Kato ...................... | B60K 6/445 |
| 2006/0161328 | A1* | 7/2006 | Hoshiba ................ | B60W 20/13 701/84 |
| 2008/0289889 | A1* | 11/2008 | Hashimoto ............ | B60K 6/445 180/65.265 |
| 2016/0075322 | A1* | 3/2016 | Saito ..................... | B60W 20/10 701/22 |
| 2016/0152225 | A1* | 6/2016 | Aoki ..................... | B60W 20/13 701/22 |
| 2016/0325747 | A1* | 11/2016 | Tsuruta ................. | B60W 20/30 |
| 2017/0066433 | A1* | 3/2017 | Muta ..................... | B60K 6/387 |
| 2017/0066434 | A1* | 3/2017 | Kato ...................... | B60W 20/14 |
| 2017/0129478 | A1* | 5/2017 | Minegishi ............. | B60W 20/50 |
| 2017/0259802 | A1* | 9/2017 | Kato ...................... | B60K 6/365 |
| 2017/0334426 | A1* | 11/2017 | Kato ...................... | B60W 50/06 |
| 2017/0349160 | A1* | 12/2017 | Kato ...................... | B60W 20/11 |

FOREIGN PATENT DOCUMENTS

| | | |
|---|---|---|
| JP | 2010-018256 A | 1/2010 |
| JP | 2010-202132 A | 9/2010 |
| JP | 2011-218827 A | 11/2011 |
| JP | 2014-144659 A | 8/2014 |
| JP | 2016-060319 A | 4/2016 |

* cited by examiner

HYBRID VEHICLE

CROSS-REFERENCE TO RELATED APPLICATIONS

This application claims priority to Japanese Patent Application No. 2016-099384 filed on May 18, 2016, the entire contents of which are hereby incorporated by reference.

BACKGROUND

1. Technical Field

The present disclosure relates to a hybrid vehicle.

2. Description of Related Art

In the related art, a hybrid vehicle in which a rotary element, which is connected to a second motor, of a planetary gear mechanism of which three rotary elements are connected to an engine, a first motor, and the second motor is connected to a drive shaft connected to vehicle wheels via a stepped gearshift has been proposed (for example, see Japanese Patent Application Publication No. 2014-144659 (JP 2014-144659 A)). Driving of such a vehicle is basically controlled as follows. First, a required driving force is set on the basis of a depression amount of an accelerator pedal by a driver and a vehicle speed, and the required driving force is multiplied by a rotation speed of the drive shaft to calculate a required power to be output from the engine. Then, a target rotation speed of the engine is set on the basis of the required power and an operation line of the engine in which fuel efficiency is optimal (a fuel efficiency optimal operation line). Then, the engine, the first motor, the second motor, and the stepped gearshift are controlled such that the engine rotates at the target rotation speed to output the required power and the required driving force is output to the drive shaft for the vehicle to travel.

SUMMARY

In the above-mentioned hybrid vehicle, an operating point of the engine can be freely set regardless of a shift stage of the stepped gearshift. Accordingly, there may be cases in which a change in the rotation speed of the engine does not match a change in the vehicle speed. When a driver steps on an accelerator pedal, power required for the engine increases and thus the rotation speed of the engine increases immediately, but the vehicle speed does not increase rapidly. Accordingly, only the engine rotation speed increases rapidly before the vehicle speed increases. In general, a driver has a driving feeling that the engine rotation speed increases with the increase in the vehicle speed. Accordingly, when only the engine rotation speed increases rapidly before the vehicle speed increases, the driver may feel discomfort in terms of the driving feeling. Even when the stepped gearshift shifts, the rotation speed of the engine may not change. When a driver steps on an accelerator pedal to increase the vehicle speed, the stepped gearshift upshifts with the increase in vehicle speed. However, when the power required for the engine does not change between before and after the upshift, the engine operates without changing the rotation speed of the engine. In this case, since the driver generally has a feeling of a change in speed in which the rotation speed of the engine decreases due to the upshift of the stepped gearshift as a driving feeling, the driver may feel discomfort in not acquiring such a feeling of a change in speed. Regarding this problem, it may be conceived that the engine rotation speed is set depending on the shift stage. However, since the engine can output only a torque corresponding to the rotation speed thereof, the driving force may be insufficient. Such a problem is true when a virtual speed level shift is performed in a hybrid vehicle not including a stepped gearshift.

The present disclosure provides a hybrid vehicle that can give a better driving feeling to a driver and prevent a driving force from becoming insufficient.

A hybrid vehicle according to an aspect of the present disclosure includes an engine, a first motor, a planetary gear mechanism, a second motor, a battery, and an electronic control unit. Three rotary elements of the planetary gear mechanism are connected to an output shaft of the engine, a rotary shaft of the first motor, and a drive shaft connected to an axle, respectively. The second motor is connected to the drive shaft and is configured to input and output power to and from the drive shaft. The battery is configured to exchange electric power with the first motor and the second motor. The electronic control unit is configured to: set a required driving force to be output to the drive shaft on the basis of a depression amount of an accelerator pedal by a driver and a vehicle speed; control the engine, the first motor, and the second motor such that the hybrid vehicle travels using the required driving force; set a target rotation speed of the engine on the basis of the depression amount of the accelerator pedal, the vehicle speed, and a shift stage such that the target rotation speed of the engine increases as the depression amount of the accelerator pedal increases; set an upper-limit driving force, the upper-limit driving force being a maximum power capable of being output from the engine when the engine operates at the target rotation speed; and control the engine, the first motor, and the second motor such that the engine operates at the target rotation speed and the smaller driving force of the upper-limit driving force and the required driving force is output to the drive shaft.

According to the hybrid vehicle of the aspect, the target rotation speed of the engine is set on the basis of the depression amount of the accelerator pedal, the vehicle speed, and a shift stage such that the target rotation speed of the engine increases as the depression amount of the accelerator pedal increases. The upper-limit driving force is set as a driving force when the maximum power capable of being output from the engine when the engine operates at the target rotation speed is output to the drive shaft, and the engine, the first motor, and the second motor are controlled such that the engine operates at the target rotation speed and the smaller driving force of the upper-limit driving force and the required driving force is output to the drive shaft. Since the target rotation speed of the engine is set on the basis of the depression amount of the accelerator pedal, the vehicle speed, and the shift stage, it is possible to operate the engine at the engine rotation speed based on the vehicle speed even when a driver steps on the accelerator pedal and to give a better driving feeling to the driver in comparison with a case in which the engine rotation speed increases rapidly before the vehicle speed increases. When the shift stage is changed (shifted) by the driver's stepping on the accelerator pedal, the target rotation speed changes with a change in the shift stage and it is thus possible to give a feeling of a change in speed to the driver. Since the target rotation speed is set to have an increasing trend as the depression amount of the accelerator pedal increases, it is possible to set a higher target rotation speed in comparison with a case in which the target rotation speed is set regardless of the depression amount of the accelerator pedal and to prevent the driving force from becoming insufficient by increasing the power capable of being output from the engine. As a result, it is possible to give a better driving feeling to a driver and to prevent a driving force from becoming insufficient.

In the hybrid vehicle according to the aspect, the electronic control unit may be configured to set a rotation speed base value of the engine on the basis of the vehicle speed and the shift stage, the electronic control unit may be configured to set a rotation speed correction value such that the rotation speed correction value increases as the depression amount of the accelerator pedal increases, and the electronic control unit may be configured to set the target rotation speed by correcting the rotation speed base value using the rotation speed correction value. According to the hybrid vehicle of the aspect, it is possible to set the rotation speed base value such that a better driving feeling is given to a driver and to set the rotation speed correction value such that the driving force is prevented from becoming insufficient.

In the hybrid vehicle according to the aspect, the electronic control unit may be configured to set the rotation speed correction value such that the rotation speed correction value is greater when the shift stage is a high-speed level than when the shift stage is a low-speed level. At a low-speed shift stage, since the hybrid vehicle travels at a relatively low speed, an increase in the power output from the engine due to the depression amount of the accelerator pedal is small. On the other hand, at a high-speed shift stage, since the hybrid vehicle travels at a relatively high speed, an increase in the power output from the engine due to the depression amount of the accelerator pedal is large. Since the power output from the engine is expressed as a product of the rotation speed and the torque, the increase in the power output from the engine is achieved by an increase in the rotation speed or an increase in the torque. Accordingly, when the increase in the output power is large, it is effective to increase the rotation speed as well as to increase the torque. According to the hybrid vehicle of the aspect, it is possible to cope with an increase in output power at a high-speed shift stage by setting a larger rotation speed correction value at a high-speed shift stage than at a low-speed shift stage.

In the hybrid vehicle according to the aspect, the electronic control unit may be configured to set the rotation speed correction value such that the rotation speed correction value is greater when the rotation speed of the engine is relatively low than when the rotation speed of the engine is relatively high. As described above, the power output from the engine is expressed as a product of the rotation speed and the torque. Accordingly, when the torque increases but the rotation speed is low, the power output from the engine is slightly greater than that when the rotation speed is high. According to the hybrid vehicle of the aspect, it is possible to cope with a larger increase in the output power even when the rotation speed is low, by setting a large rotation speed correction value when the rotation speed is low.

In the hybrid vehicle according to the aspect, the electronic control unit may be configured to set the target rotation speed such that a rate of change of the target rotation speed decreases when a temperature of the battery decreases when the rotation speed of the engine increases by setting the rotation speed correction value. In a transition period in which the rotation speed of the engine is increasing, the power required for increasing the rotation speed of the engine and an insufficient power for driving power need to be covered with an output from the battery. When the temperature of the battery is low, the output of the battery is small. Accordingly, the power required for increasing the rotation speed of the engine and the insufficient power for driving power are not covered and the driving power becomes insufficient. According to the hybrid vehicle of the aspect, it is possible to prevent the driving power from becoming insufficient by slowly increasing the rotation speed of the engine when the temperature of the battery is low.

In the hybrid vehicle according to the aspect, the electronic control unit may be configured to set the shift stage on the basis of the depression amount of the accelerator pedal and the vehicle speed or on the basis of the driver's shifting operation. That is, the shift stage may be set by an automatic gearshift or may be set by the driver's shifting operation.

In the hybrid vehicle according to the aspect, the shift stage may be a virtual shift stage. The hybrid vehicle may further include a stepped gearshift attached between the drive shaft and the planetary gear mechanism, and the shift stage may be a shift stage of the stepped gearshift or a shift stage obtained by adding a virtual shift stage to the shift stage of the stepped gearshift. Here, the "shift stage obtained by adding a virtual shift stage to the shift stage of the stepped gearshift" indicates that the shift stages of the stepped gearshift and the virtual shift stages are combined to achieve a total of four shift stages by adding the virtual shift stages in two steps to the shift stages of the stepped gearshift in two steps or to achieve a total of eight shift stages by adding the virtual shift stages in two steps to the shift stages of the stepped gearshift of four steps. Accordingly, it is possible to utilize a desired number of shift stages.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described below with reference to the accompanying drawings.

Figure 1:
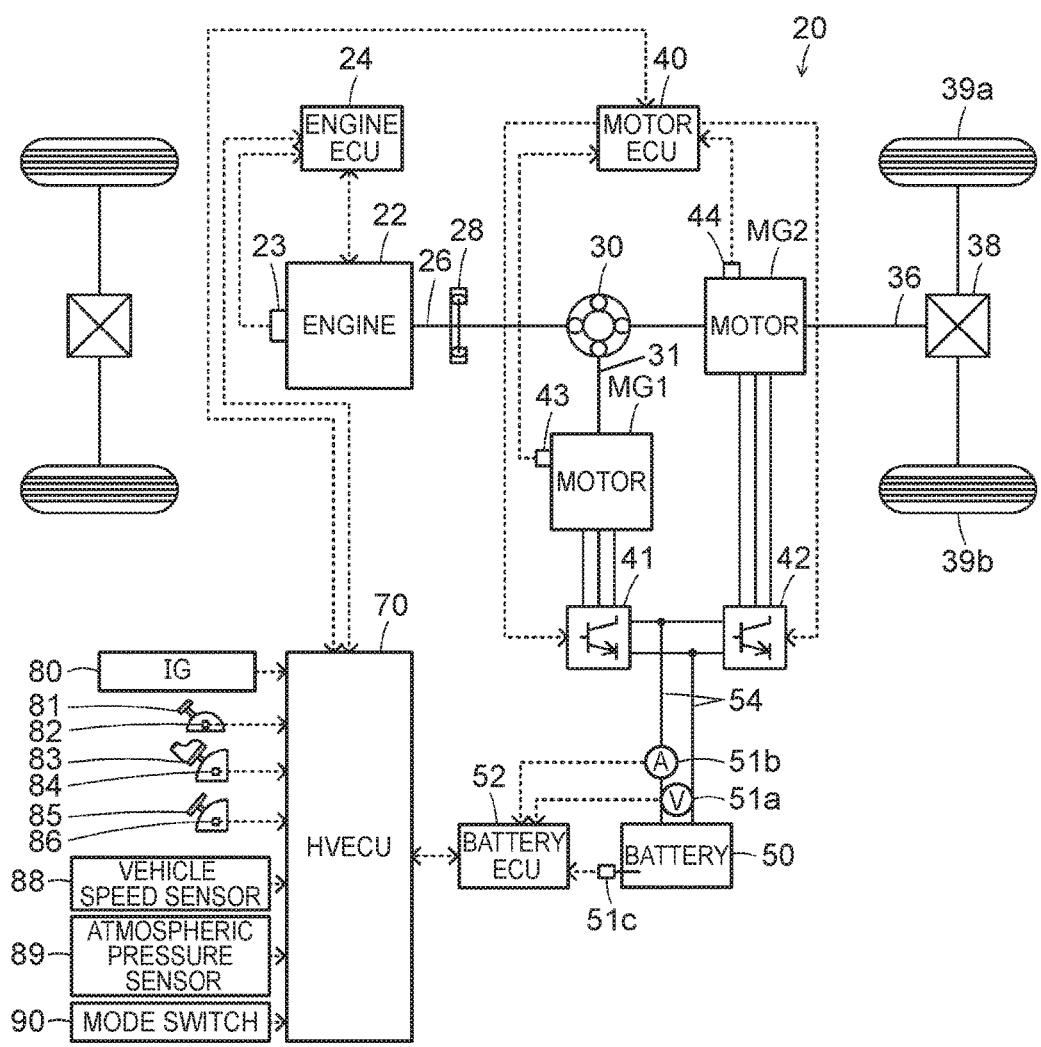
FIG. 1 is a diagram schematically illustrating a configuration of a hybrid vehicle 20 according to a first embodiment.

FIG. 1 is a diagram schematically illustrating a configuration of a hybrid vehicle 20 according to a first embodiment of the present disclosure. As illustrated in the drawing, the hybrid vehicle 20 according to the first embodiment includes an engine 22, a planetary gear 30, motors MG1 and MG2, inverters 41 and 42, a battery 50, and a hybrid electronic control unit (hereinafter referred to as an "HVECU") 70.

The engine 22 is constituted by an internal combustion engine that outputs power using gasoline, diesel, or the like as fuel. Operation of the engine 22 is controlled by an engine electronic control unit (hereinafter referred to as an "engine ECU") 24.

Although not illustrated in the drawing, the engine ECU 24 is constituted by a microprocessor centered on a CPU and includes a ROM that stores a processing program, a RAM that temporarily stores data, input and output ports, and a communication port in addition to the CPU. Signals from various sensors required for controlling the operation of the engine 22 are input to the engine ECU 24 via the input port. Examples of the signals input to the engine ECU 24 include a crank angle θcr from a crank position sensor 23 that detects a rotational position of a crank shaft 26 of the engine 22 and a throttle opening level TH from a throttle valve position sensor that detects a position of a throttle valve. Various control signals for controlling the driving of the engine 22 are output from the engine ECU 24 via the output port. Examples of the signals output from the engine ECU 24 include a drive control signal to a throttle motor that adjusts the position of the throttle valve, a drive control signal to a fuel injection valve, and a drive control signal to an ignition coil integrated with an igniter. The engine ECU 24 is connected to the HVECU 70 via the communication port, controls driving of the engine 22 using a control signal from the HVECU 70, and outputs data on an operating state of the engine 22 to the HVECU 70 if necessary. The engine ECU 24 calculates a rotation speed of the crank shaft 26, that is, a rotation speed Ne of the engine 22, on the basis of a crank angle θcr from the crank position sensor 23.

The planetary gear 30 is constituted by a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via a damper 28.

The motor MG1 is constituted, for example, by a synchronous generator-motor and the rotor thereof is connected to the sun gear of the planetary gear 30 as described above. The motor MG2 is constituted, for example, by a synchronous generator-motor and the rotor thereof is connected to the drive shaft 36. The inverters 41 and 42 are connected to the battery 50 via power lines 54. The motors MG1 and MG2 are rotationally driven by controlling switching of a plurality of switching elements, which are not illustrated, of the inverters 41 and 42 by a motor electronic control unit (hereinafter referred to as a "motor ECU") 40.

Although not illustrated in the drawing, the motor ECU 40 is constituted by a microprocessor centered on a CPU and includes a ROM that stores a processing program, a RAM that temporarily stores data, input and output ports, and a communication port in addition to the CPU. Signals from various sensors required for controlling driving of the motors MG1 and MG2 are input to the motor ECU 40 via the input port. Examples of the signals input to the motor ECU 40 include rotational positions θm1 and θm2 from rotational position sensors 43 and 44 that detect rotational positions of the rotors of the motors MG1 and MG2 and phase currents from current sensors that detect currents flowing in phases of the motors MG1 and MG2. Switching control signals to switching elements, which are not illustrated, of the inverters 41 and 42 are output from the motor ECU 40 via the output port. The motor ECU 40 is connected to the HVECU 70 via the communication port, controls driving of the motors MG1 and MG2 using a control signal from the HVECU 70, and outputs data on driving states of the motors MG1 and MG2 to the HVECU 70 if necessary. The motor ECU 40 calculates the rotation speeds Nm1 and Nm2 of the motors MG1 and MG2 on the basis of the rotational positions θm1 and θm2 of the rotors of the motors MG1 and MG2 from the rotational position sensors 43 and 44.

The battery 50 is constituted, for example, by a lithium ion secondary battery or a nickel hydride secondary battery and is connected to the inverters 41 and 42 via the power lines 54. The battery 50 is managed by a battery electronic control unit (hereinafter referred to as a "battery ECU") 52.

Although not illustrated in the drawing, the battery ECU 52 is constituted by a microprocessor centered on a CPU and includes a ROM that stores a processing program, a RAM that temporarily stores data, input and output ports, and a communication port in addition to the CPU. Signals from various sensors required for managing the battery 50 are input to the battery ECU 52 via the input port. Examples of the signals input to the battery ECU 52 include a battery voltage Vb from a voltage sensor 51a disposed between terminals of the battery 50, a battery current Ib from a current sensor 51b attached to an output terminal of the battery 50, and a battery temperature Tb from a temperature sensor 51c attached to the battery 50. The battery ECU 52 is connected to the HVECU 70 via the communication port and outputs data on a state of the battery 50 to the HVECU 70 if necessary. The battery ECU 52 calculates a power storage ratio SOC on the basis of an integrated value of the battery current Ib from the current sensor 51b. The power storage ratio SOC is a ratio of dischargeable power of the battery 50 to a full capacity of the battery 50.

Although not illustrated in the drawing, the HVECU 70 is constituted by a microprocessor centered on a CPU and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80, a shift position SP from a shift position sensor 82 that detects an operating position of a shift lever 81, a depression amount of an accelerator Acc from an accelerator pedal position sensor 84 that detects a degree of stepping on an accelerator pedal 83, and a brake pedal position BP from a brake pedal position sensor 86 that detects a degree of stepping on a brake pedal 85. Examples of the input signals also include a vehicle speed V from a vehicle speed sensor 88, an atmospheric pressure Pa from an atmospheric pressure sensor 89, and a mode switching control signal from a mode switch 90. As described above, the HVECU 70 is connected to the engine ECU 24, the motor ECU 40, and the battery ECU 52 via the communication port and gives and takes various control signals or data to and from the engine ECU 24, the motor ECU 40, and the battery ECU 52.

Examples of the shift position SP include a parking position (P position), a reversing position (R position), a neutral position (N position), a driving position (D position), and a manual position (M position). The manual position (M position) is provided with an upshift position (+ position) and a downshift position (− position). When the shift position SP is changed to the manual position (M position), driving of the engine 22 is controlled such that it is connected to the drive shaft 36 via an automatic gearshift of six virtual shift stages. The mode switch 90 is a switch which is used to select driving modes including a driving feeling priority mode in which fuel efficiency is slightly decreased but a driver's driving feeling (drivability or driving feeling) has priority and a normal driving mode in which fuel efficiency has priority. When the normal driving mode is selected and the shift position SP is the driving position (D position), driving of the engine 22 and the motors MG1 and MG2 are controlled such that static inertia and fuel efficiency are compatible with each other. When the driving feeling priority mode is selected and the shift position SP is the driving position (D position), driving of the engine 22 is controlled such that the engine is connected to the drive shaft 36 via the automatic gearshift of six virtual shift stages.

The hybrid vehicle 20 according to the first embodiment having the above-mentioned configuration travels in any one of a plurality of driving modes including a hybrid driving (HV driving) mode and an electrical driving (EV driving) mode. Here, the HV driving mode is a mode in which the vehicle travels using power from the engine 22 and power from the motors MG1 and MG2 while operating the engine 22. The EV driving mode is a mode in which the vehicle travels using power from the motor MG2 without operating the engine 22.

Figure 2:
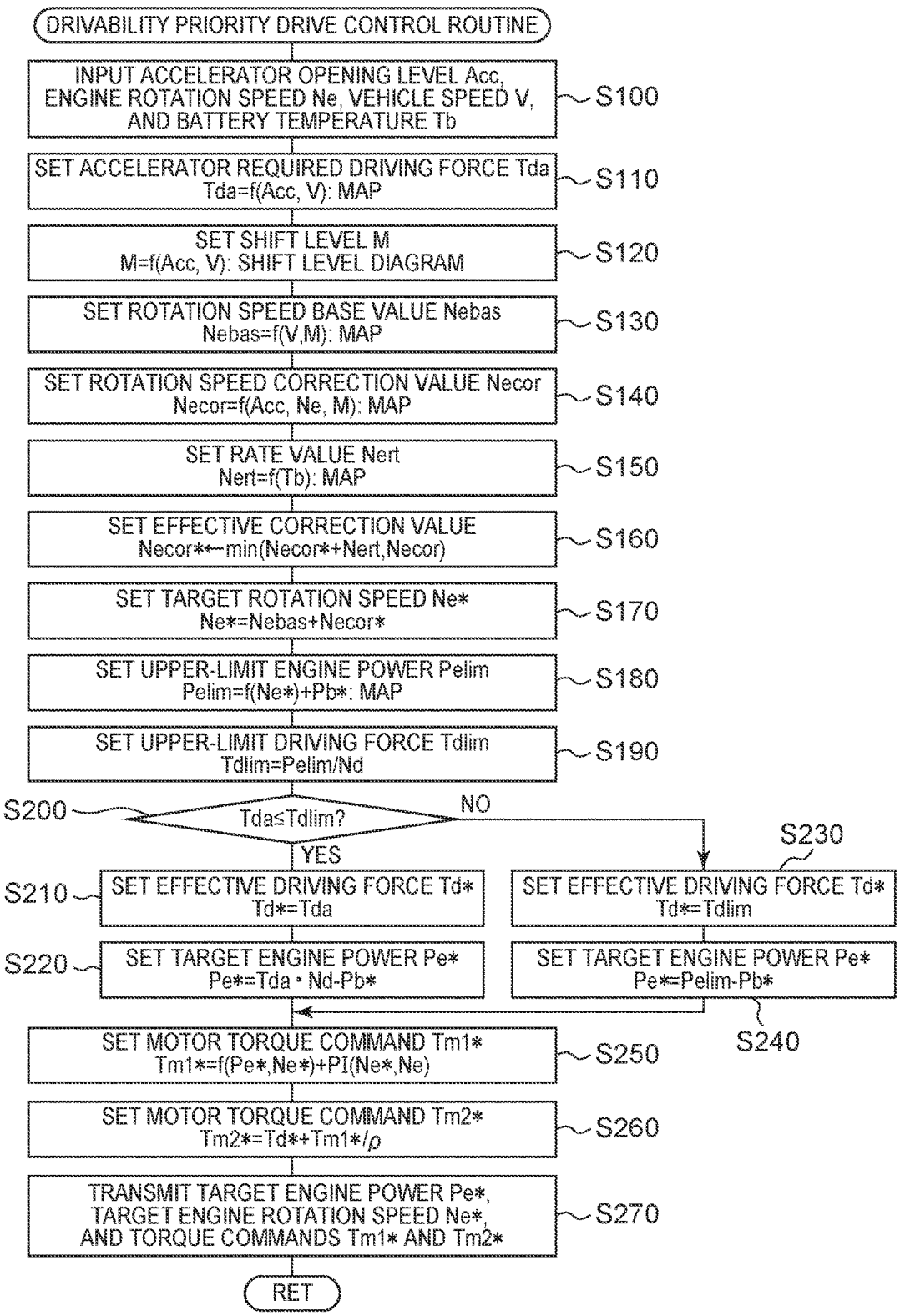
FIG. 2 is a flowchart illustrating an example of a drivability priority drive control routine which is performed by an HVECU 70 when a D position is set in a driving feeling priority mode.

The operation of the hybrid vehicle 20 having the above-mentioned configuration, particularly, the operation when a driving feeling priority mode is selected by the mode switch 90, will be described below. FIG. 2 is a flowchart illustrating an example of a drivability priority drive control routine which is performed by the HVECU 70 when the driving feeling priority mode is selected and the shift position SP upshifts to the driving position (D position). This routine is repeatedly performed at predetermined times (for example, every several msec). Before describing drive control when the D position is set in the driving feeling priority mode using the drivability priority drive control routine illustrated in FIG. 2, drive control when the D position is set in the driving feeling priority mode (drive control in the HV driving mode) will be first described for the purpose of convenience of explanation.

In the normal driving mode, when the vehicle travels in the HV driving mode, drive control is performed as follows by the HVECU 70. The HVECU 70 first calculates an accelerator required driving force Tda which is required for traveling (required for the drive shaft 36) on the basis of the depression amount of the accelerator Acc and the vehicle speed V and sets the accelerator required driving force Tda as an effective driving force Td*. The accelerator required driving force Tda can be calculated, for example, from an accelerator required driving force setting map illustrated in FIG. 3. Subsequently, the set effective driving force Td* is multiplied by a rotation speed Nd of the drive shaft 36 to calculate a driving required power Pedrv required for traveling. Here, a rotation speed obtained by multiplying the rotation speed Nm2 of the motor MG2 by a conversion factor km, a rotation speed obtained by multiplying the vehicle speed V by a conversion factor kv, or the like can be used as the rotation speed Nd of the drive shaft 36. A charging/discharging required power Pb* (which has a positive value when power is discharged from the battery 50) of the battery 50 is set such that the power storage ratio SOC of the battery 50 approaches a target ratio SOC*, and a target engine power Pe* is calculated by subtracting the charging/discharging required power Pb* of the battery 50 from the driving required power Pedrv as expressed by Expression (1). The charging/discharging required power Pb* is set, for example, using a charging/discharging required power setting map illustrated in FIG. 4. In the charging/discharging required power setting map, a dead zone from a value S1 to a value S2 with respect to the target ratio SOC* is provided and the charging/discharging required power Pb* is set as discharging power (power with a positive value) when the power storage ratio SOC is greater than the upper limit value S2 of the dead zone, and is set as charging power (power with a negative value) when the power storage ratio SOC is less than the lower limit value S1 of the dead zone.

$$Pe^* = Pedrv - Pb^* \tag{1}$$

Figure 5:
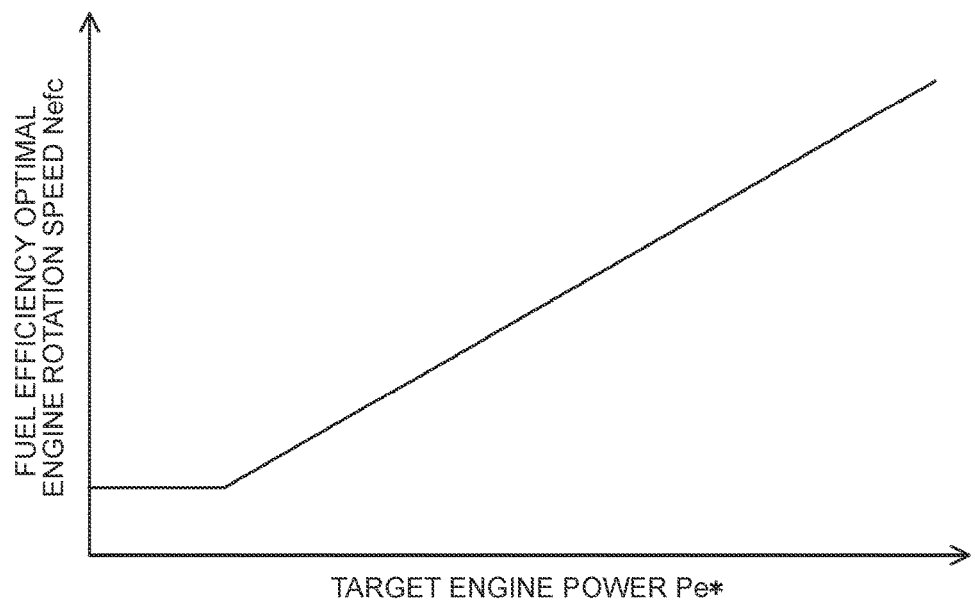
FIG. 5 is a diagram illustrating an example of a fuel efficiency optimal engine rotation speed setting map.

Then, a fuel efficiency optimal engine rotation speed Nefc is calculated using the target engine power Pe* and a fuel efficiency optimal engine rotation speed setting map, and the fuel efficiency optimal engine rotation speed Nefc is set as the target engine rotation speed Ne*. An example of the fuel efficiency optimal engine rotation speed setting map is illustrated in FIG. 5. The fuel efficiency optimal engine rotation speed setting map is determined as a relationship between the target engine power Pe* and the rotation speed at which the engine 22 can efficiently operate by experiment or the like. Since the fuel efficiency optimal engine rotation speed Nefc basically increases as the target engine power Pe* increases, the target engine rotation speed Ne* also increases as the target engine power Pe* increases. Subsequently, as expressed by Expression (2), a torque command Tm1* of the motor MG1 is calculated using the rotation speed Ne of the engine 22, the target engine rotation speed Ne*, the target engine power Pe*, and a gear ratio ρ of the planetary gear 30 (the number of teeth of the sun gear/the number of teeth of the ring gear). Expression (2) is a relational expression of rotation speed feedback control for causing the engine 22 to rotate at the target engine rotation speed Ne*. In Expression (2), the first term on the right side is a feedforward term, and the second and third terms on the right side are a proportional term and an integral term of a feedback term. The first term on the right side denotes a torque which is used for the motor MG1 to receive a torque output from the engine 22 and applied to the rotary shaft 31 of the motor MG1 via the planetary gear 30. "kp" of the second term on the right side denotes a gain of the proportional term, and "ki" of the third term on the right side denotes a gain of the integral term. Considering a case in which the engine 22 is in a substantially static state (when the target engine rotation speed Ne* and the target engine power Pe* are substantially constant), it can be seen that as the target engine power Pe* increases, the first term on the right side of Expression (2) decreases (the absolute value thereof increases), the torque command Tm1* of the motor MG1 decreases (increases to the negative side), and power of the motor MG1 (which has a positive value when power is consumed) obtained by multiplying the torque command Tm1* of the motor MG1 by the rotation speed Nm1 decreases (generated power increases).

$$Tm1^* = -(Pe^*/Ne^*) \cdot [\rho/(1+\rho)] + kp \cdot (Ne^* - Ne) + ki \cdot \int (Ne^* - Ne) dt \quad (2)$$

Then, as expressed by Expression (3), a torque command Tm2* of the motor MG2 is set by subtracting a torque (-Tm1*/ρ) output from the motor MG1 and applied to the drive shaft 36 via the planetary gear 30 when the motor MG1 is driven in accordance with the torque command Tm1* from the effective driving force Td*. The torque command Tm2* of the motor MG2 is limited to a torque limit Tm2max obtained from an output limit Wout of the battery 50 using Expression (4). As expressed by Expression (4), the torque limit Tm2max is obtained by subtracting a power of the motor MG1, which is obtained by multiplying the torque command Tm1* of the motor MG1 by the rotation speed Nm1, from the output limit Wout of the battery 50 and dividing the resultant value by the rotation speed Nm2 of the motor MG2.

$$Tm2^* = Td^* + Tm1^*/\rho \quad (3)$$

$$Tm2\text{max} = (Wout - Tm1^* \cdot Nm1)/Nm2 \quad (4)$$

When the target engine power Pe*, the target engine rotation speed Ne*, and the torque commands Tm1* and Tm2* of the motors MG1 and MG2 are set in this way, the target engine power Pe* and the target engine rotation speed Ne* are transmitted to the engine ECU 24 and the torque commands Tm1* and Tm2* of the motors MG1 and MG2 are transmitted to the motor ECU 40.

When the target engine power Pe* and the target engine rotation speed Ne* are received, the engine ECU 24 performs intake air volume control, fuel injection control, ignition control, and the like of the engine 22 such that the engine 22 operates on the basis of received target engine power Pe* and the received target engine rotation speed Ne*. When the torque commands Tm1* and Tm2* of the motors MG1 and MG2 are received, the motor ECU 40 performs switching control of a plurality of switching elements of the inverters 41 and 42 such that the motors MG1 and MG2 are driven with the torque commands Tm1* and Tm2*.

When the target engine power Pe* is less than a threshold value Pref in the HV driving mode, it is determined that a stop condition of the engine 22 is satisfied and the operation of the engine 22 stops to transition to the EV driving mode.

In the EV driving mode, the HVECU 70 sets the effective driving force Td* in the same way as in the HV driving mode, sets the torque command Tm1* of the motor MG1 to a value of 0, and sets the torque command Tm2* of the motor MG2 in the same way as in the HV driving mode. The torque commands Tm1* and Tm2* of the motors MG1 and MG2 are transmitted to the motor ECU 40. Then, the motor ECU 40 performs switching control of a plurality of switching elements of the inverters 41 and 42 as described above.

In the EV driving mode, when the target engine power Pe* calculated in the same way as in the HV driving mode is equal to or greater than the threshold value Pref, it is determined that a start condition of the engine 22 is satisfied and the engine 22 starts to transition to the HV driving mode.

Drive control when the D position is set in the driving feeling priority mode will be described below with reference to the drivability priority drive control routine illustrated in FIG. 2. When the drivability priority drive control routine is performed, the HVECU 70 receives the depression amount of the accelerator Acc from the accelerator pedal position sensor 84, the vehicle speed V from the vehicle speed sensor 88, the rotation speed Ne of the engine 22, and the battery temperature Tb (Step S100). Here, as the rotation speed Ne of the engine 22, a value calculated on the basis of the crank angle θcr from the crank position sensor 23 can be received from the engine ECU 24 by communication. As the battery temperature Tb, a value detected by a temperature sensor 51c can be received from the battery ECU 52 by communication.

Figure 6:
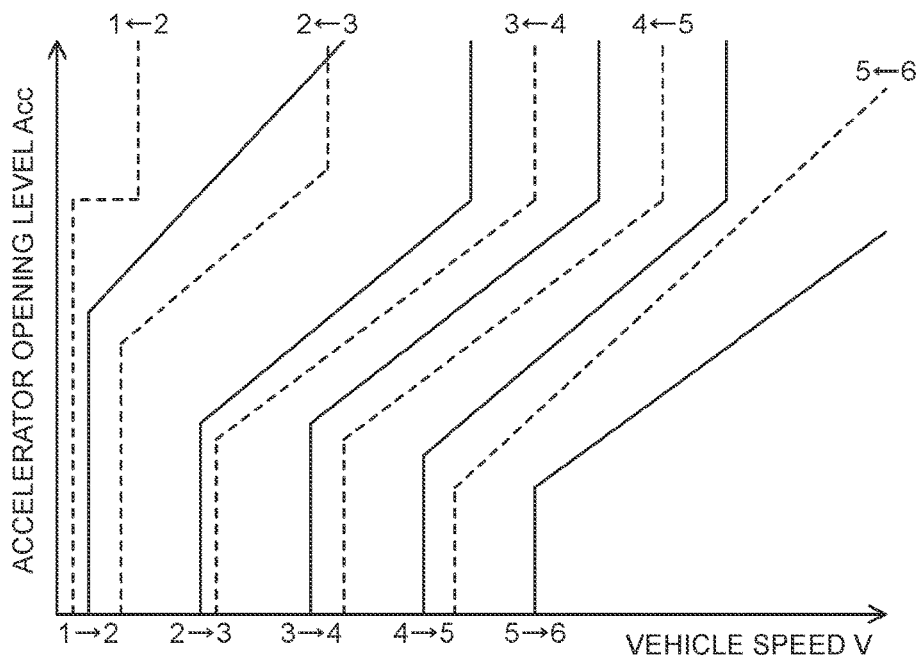
FIG. 6 is a diagram illustrating an example of a shift stage diagram.

Subsequently, the accelerator required driving force Tda is set using the depression amount of the accelerator Acc, the vehicle speed V, and an accelerator required driving force setting map illustrated in FIG. 3 (Step S110) and the shift stage M is set using the depression amount of the accelerator Acc, the vehicle speed V, and the shift stage diagram (Step S120). FIG. 6 illustrates an example of the shift stage diagram. In the drawing, solid lines denote upshift lines, and dotted lines denote downshift lines. In the first embodiment, since control is performed with the automatic gearshift of six virtual shift stages, the shift stage diagram also corresponds to six shift stages.

Figure 7:
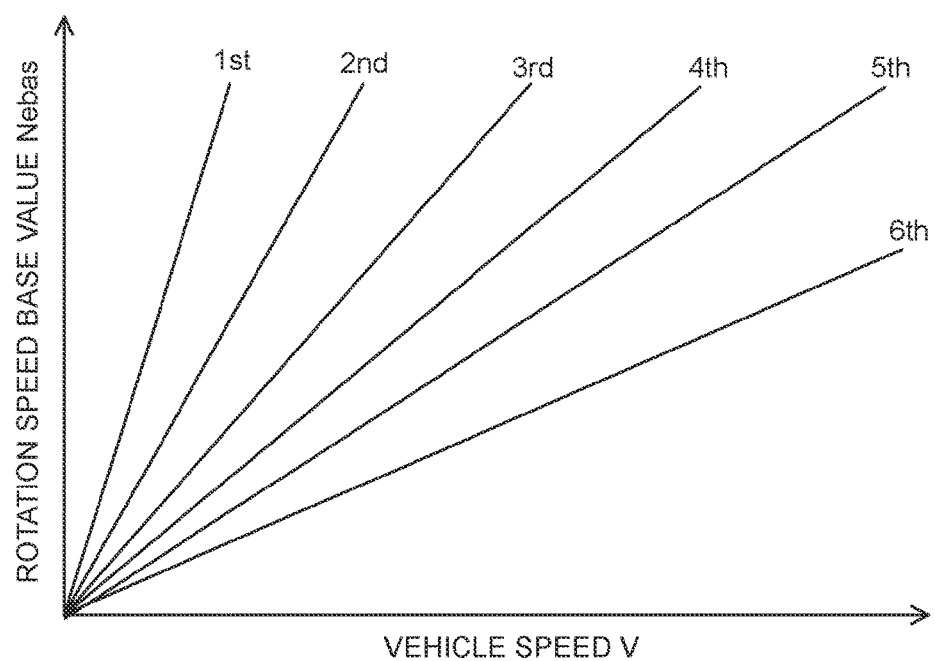
FIG. 7 is a diagram illustrating an example of a rotation speed base value setting map.

When the accelerator required driving force Tda and the shift stage M are set, a rotation speed base value Nebas is set using the vehicle speed V, the shift stage M, and a rotation speed base value setting map (Step S130). FIG. 7 illustrates an example of the rotation speed base value setting map. In the rotation speed base value setting map of the first embodiment, the rotation speed base value Nebas is set in a linear relationship with the vehicle speed V for each shift stage such that a slope with respect to the vehicle speed V decreases as the shift stage increases. The reason for setting the rotation speed base value Nebas in this way is to give a driving feeling of a vehicle equipped with an automatic gearshift to a driver by increasing the rotation speed Ne of the engine 22 with an increase in the vehicle speed V for each shift stage, or decreasing the rotation speed Ne of the engine 22 in upshifting and increasing the rotation speed Ne of the engine 22 in downshifting.

Figure 8:
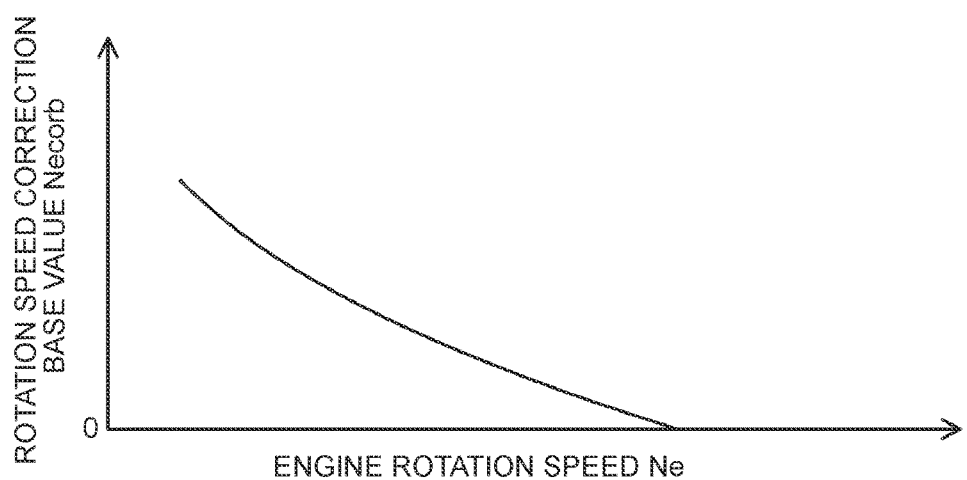
FIG. 8 is a diagram illustrating an example of a relationship between an engine rotation speed Ne and a rotation speed correction base value Necorb.
Figure 9:
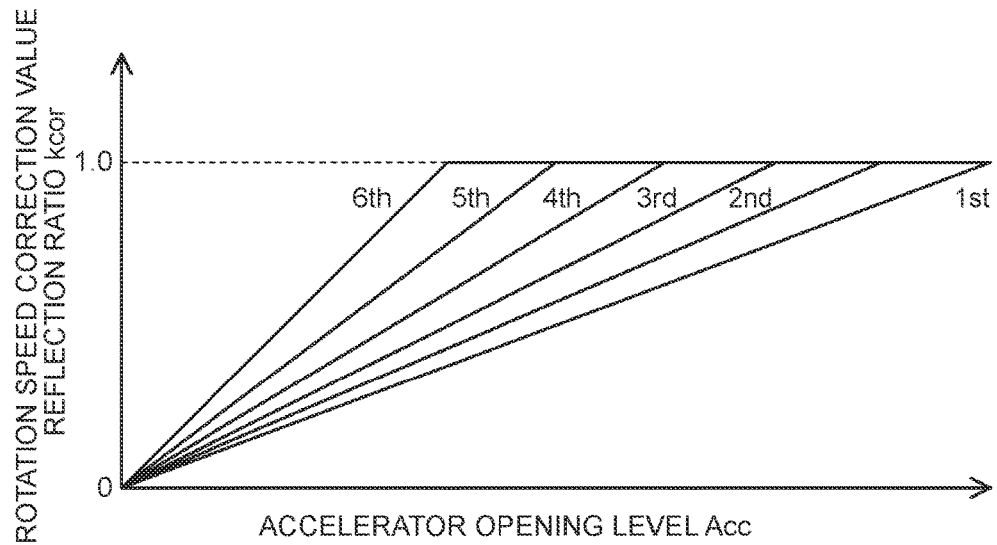
FIG. 9 is a diagram illustrating an example of a relationship between a depression amount of an accelerator Acc, a shift stage M, and a rotation speed correction value reflection ratio kcor.

Subsequently, a rotation speed correction value Necor is set on the basis of the depression amount of the accelerator Acc, the rotation speed Ne of the engine 22, and the shift stage M (Step S140). In the first embodiment, a rotation speed correction base value Necorb is calculated on the basis of the engine rotation speed Ne, a rotation speed correction value reflection ratio kcor is calculated on the basis of the depression amount of the accelerator Acc and the shift stage M, and the rotation speed correction value Necor is calculated and set as a product of the rotation speed correction base value Necorb and the rotation speed correction value reflection ratio kcor. An example of a relationship between the engine rotation speed Ne and the rotation speed correction base value Necorb is illustrated in FIG. 8, and an example of a relationship between the depression amount of the accelerator Acc, the shift stage M, and the rotation speed correction value reflection ratio kcor is illustrated in FIG. 9. As illustrated in FIG. 8, the rotation speed correction base value Necorb is set to have an increasing trend as the rotation speed Ne of the engine 22 decreases. Accordingly, the rotation speed correction value Necor is set to have an increasing trend as the rotation speed Ne of the engine 22 decreases. A power Pe output from the engine 22 is expressed as a product of a rotation speed Ne and a torque Te. Accordingly, the power Pe output from the engine 22 can be increased by increasing the rotation speed Ne or increasing the torque Te. By setting a large rotation speed correction base value Necorb to set a large rotation speed correction value Necor when the rotation speed Ne of the engine 22 is low, it is possible to cope with a larger increase in the output power Pe even when the rotation speed Ne of the engine 22 is low. As illustrated in FIG. 9, the rotation speed correction value reflection ratio kcor is set to have an increasing trend as the depression amount of the accelerator Acc increases. Accordingly, the rotation speed correction value Necor is set to have an increasing trend as the depression amount of the accelerator Acc increases. As the depression amount of the accelerator Acc increases, the accelerator required driving force Tda increases and the required power to be output from the engine 22 also increases. By increasing the rotation speed correction value reflection ratio kcor to set a large rotation speed correction value Necor as the depression amount of the accelerator Acc increases, it is possible to output a higher power from the engine 22. The rotation speed correction value reflection ratio kcor is set to a larger value as the shift stage M becomes a higher-speed shift stage. Accordingly, the rotation speed correction value Necor is set to a larger value as the shift stage M becomes a higher-speed shift stage. At a high-speed level, since the hybrid vehicle travels at a relatively high speed, an increase in power with respect to an increase in the depression amount of the accelerator Acc is great. Accordingly, by setting a large rotation speed correction value Necor using a large rotation speed correction value reflection ratio kcor at a high-speed shift stage, it is possible to cope with an increase in the output power Pe of the engine 22 accompanied with an increase in the depression amount of the accelerator Acc at a high-speed shift stage.

Figure 10:
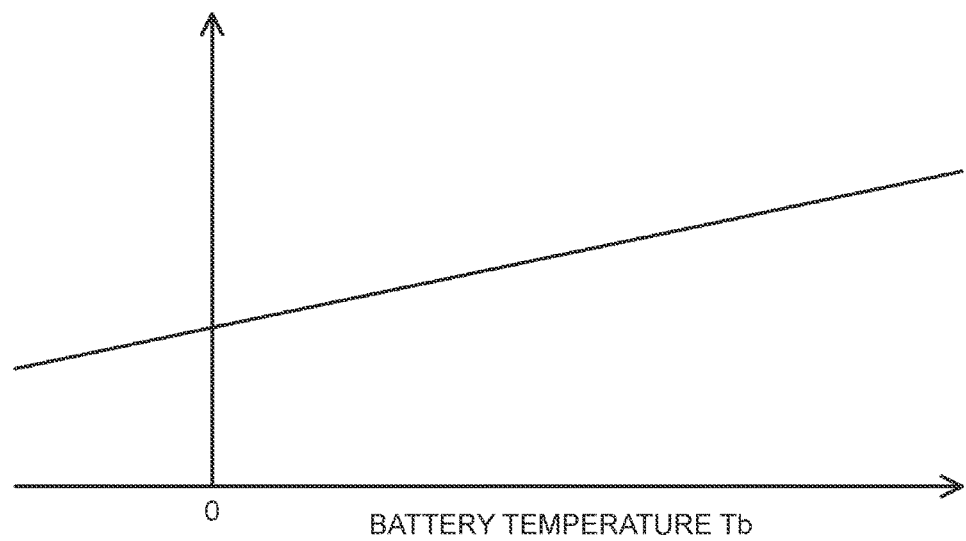
FIG. 10 is a diagram illustrating an example of a rate value setting map.

Then, a rate value Nert is set using the temperature Tb of the battery 50 and a rate value setting map (Step S150), the smaller of a value obtained by adding the rate value Nert to an effective correction value Necor* and the rotation speed correction value Necor is set as a new effective correction value Necor* (Step S160), and the sum of the rotation speed base value Nebas and the effective correction value Necor* is set as the target rotation speed Ne* of the engine 22 (Step S170). Here, the rate value Nert is a degree of increase in a rate limiting process of causing the effective correction value Necor* to stepwise reach the rotation speed correction value Necor. When the rate value Nert is large, the effective correction value Necor* rapidly reaches the rotation speed correction value Necor. When the rate value Nert is small, the effective correction value Necor* slowly reaches the rotation speed correction value Necor. Accordingly, the target rotation speed Ne* rapidly increases when the rate value Nert is large, and the target rotation speed Ne* slowly increases when the rate value Nert is small. An example of the rate value setting map is illustrated in FIG. 10. As illustrated in the drawing, in the first embodiment, the lower the battery temperature Tb becomes, the smaller the rate value Nert to be set becomes. In a transition period in which the rotation speed Ne of the engine 22 increases, the power required for increasing the rotation speed Ne of the engine 22 and the insufficient power for driving power need to be covered with the output from the battery 50. When the temperature Tb of the battery 50 is low, the output of the battery 50 decreases. Accordingly, the power required for increasing the rotation speed Ne of the engine 22 and the insufficient power for driving power are not covered and the driving power is insufficient. As a result, when the temperature Tb of the battery 50 is low, it is possible to prevent insufficiency of the driving power by slowly increasing the rotation speed Ne of the engine 22. Accordingly, as the battery temperature Tb decreases, a smaller rate value Neil is set and the target rotation speed Ne* is slowly increased. That is, the target rotation speed Ne* is set such that a rate of change of the target rotation speed Ne* decreases as the battery temperature Tb decreases. When the rotation speed correction value Necor is smaller than a value obtained by adding the rate value Nert to the effective correction value Necor* by repeatedly performing the routine, the target rotation speed Ne* of the engine 22 is calculated as the sum of the rotation speed base value Nebas and the rotation speed correction value Necor.

Figure 11:
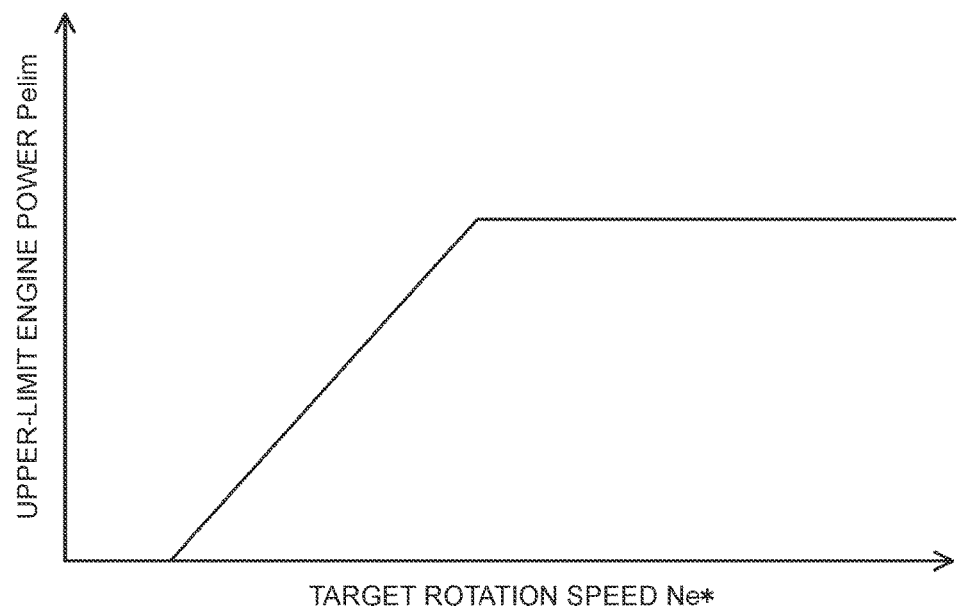
FIG. 11 is a diagram illustrating an example of an upper-limit engine power setting map.

An upper-limit engine power Pelim is set by adding the charging/discharging required power Pb* to a temporary upper-limit engine power Pelim obtained using the target rotation speed Ne* and an upper-limit engine power setting map (Step S180). An example of the upper-limit engine power setting map is illustrated in FIG. 11. The reason for addition of the charging/discharging required power Pb* is not to change the power output from the engine 22 even when the battery 50 is charged or discharged. This will be described later. When the power storage ratio SOC is in a dead zone (a range from a value S1 to a value S2 in FIG. 4) centered on a target ratio SOC*, the charging/discharging required power Pb* is set to 0 and thus the temporary upper-limit engine power Pelim obtained from the upper-limit engine power setting map is set as the upper-limit engine power Pelim. When the upper-limit engine power Pelim is set in this way, an upper-limit driving force Tdlim is set by dividing the upper-limit engine power Pelim by the rotation speed Nd of the drive shaft 36 (Step S190). As the rotation speed Nd of the drive shaft 36, a rotation speed obtained by multiplying the rotation speed Nm2 of the motor MG2 by the conversion factor km or a rotation speed obtained by multiplying the vehicle speed V by a conversion factor kv can be used as described above.

The accelerator required driving force Tda and the upper-limit driving force Tdlim are compared (Step S200). When the accelerator required driving force Tda is equal to or less than the upper-limit driving force Tdlim, the accelerator required driving force Tda is set as the effective driving force Td* (Step S210) and a value obtained by subtracting the charging/discharging required power Pb* from a value which is obtained by multiplying the accelerator required driving force Tda by the rotation speed Nd of the drive shaft 36 is set as the target engine power Pe* (Step S220), similarly to the normal driving mode. Accordingly, the target engine power Pe* can be said to be power for outputting the accelerator required driving force Tda to the drive shaft 36.

On the other hand, when it is determined in Step S200 that the accelerator required driving force Tda is greater than the upper-limit driving force Tdlim, the upper-limit driving force Tdlim is set as the effective driving force Td* (Step S230) and a value obtained by subtracting the charging/discharging required power Pb* from the upper-limit engine power Pelim is set as the target engine power Pe* (Step S240). Since the upper-limit engine power Pelim is set by adding the charging/discharging required power Pb* to the temporary upper-limit engine power Pelim obtained from the upper-limit engine power setting map in Step S180, setting a value obtained by subtracting the charging/discharging required power Pb* from the upper-limit engine power Pelim as the target engine power Pe* refers to setting the temporary upper-limit engine power Pelim obtained from the upper-limit engine power setting map as the target engine power Pe*. In this way, by considering the charging/discharging required power Pb*, the operating point of the engine 22 can be maintained to be constant regardless of charging/discharging of the battery 50. Since the upper-limit driving force Tdlim is calculated by dividing the upper-limit engine power Pelim by the rotation speed Nd of the drive shaft 36 in Step S190, the upper-limit engine power Pelim can be said to be power for outputting the upper-limit driving force Tdlim to the drive shaft 36.

Then, the torque command Tm1* of the motor MG1 is set using Expression (2) (Step S250) and the torque command Tm2* of the motor MG2 is set using Expression (3) (Step S260). The target engine power Pe* and the target engine rotation speed Ne* are transmitted to the engine ECU 24, the torque commands Tm1* and Tm2* are transmitted to the motor ECU 40 (Step S270), and the routine ends.

In the above-mentioned hybrid vehicle 20 according to the first embodiment, when the shift position is the D position in the driving feeling priority mode, a shift stage M is first set on the basis of the depression amount of the accelerator Acc and the vehicle speed V. Subsequently, the rotation speed base value Nebas is set on the basis of the vehicle speed V and the shift stage M, the rotation speed correction value Necor is set on the basis of the depression amount of the accelerator Acc, the rotation speed Ne of the engine 22, and the shift stage M such that the rotation speed correction value Necor increases as the depression amount of the accelerator Acc increases, and the target rotation speed Ne* of the engine 22 is basically set as the sum of the rotation speed base value Nebas and the rotation speed correction value Necor. On the other hand, the upper-limit engine power Pelim is set on the basis of the target rotation speed Ne* and the upper-limit driving force Tdlim is set by dividing the upper-limit engine power Pelim by the rotation speed Nd of the drive shaft 36. The power for outputting the smaller of the accelerator required driving force Tda and the upper-limit driving force Tdlim to the drive shaft 36 is set as the target engine power Pe*, and the engine 22 and the motors MG1 and MG2 are controlled such that the target engine power Pe* is output from the engine 22 and the smaller driving force of the accelerator required driving force Tda and the upper-limit driving force Tdlim is output to the drive shaft 36 for the hybrid vehicle to travel. Briefly speaking, the target engine power Pe*, which is set such that the engine 22 rotates at the target rotation speed Ne* obtained by correcting the rotation speed base value Nebas based on the vehicle speed V and the shift stage M using the rotation speed correction value Necor based on the depression amount of the accelerator Acc, the rotation speed Ne, and the shift stage M and the smaller of the accelerator required driving force Tda set not in consideration of the shift stage M and the upper-limit driving force Tdlim set in consideration of the shift stage M is output to the drive shaft 36, is output from the engine 22 for the hybrid vehicle to travel. Accordingly, when the driver steps on the accelerator pedal 83, it is possible to drive the engine 22 at the engine rotation speed Ne based on the vehicle speed V and to give a better driving feeling to the driver in comparison with a case in which the rotation speed Ne of the engine 22 increases rapidly before the vehicle speed V increases. When the shift stage M is changed (shifted), the target engine power Pe* based on the shift stage M also changes and it is thus possible to give a feeling of a change in speed to the driver. As a result, it is possible to give a good driving feeling to the driver. Since the target rotation speed Ne* of the engine 22 is set by setting the rotation speed correction value Necor to have an increasing trend as the depression amount of the accelerator Acc increases, it is possible to set a higher target rotation speed Ne* in comparison with a case in which the target rotation speed Ne* of the engine 22 is set regardless of the depression amount of the accelerator Acc and to prevent the driving force to the output to the drive shaft 36 from becoming insufficient by increasing the power capable of being output from the engine 22. As a result, it is possible to give a better driving feeling to a driver and to prevent a driving force from becoming insufficient.

In the hybrid vehicle 20 according to the first embodiment, when the accelerator required driving force Tda is greater than the upper-limit driving force Tdlim in charging/discharging the battery 50, the upper-limit engine power Pelim is set by adding the charging/discharging required power Pb* to the temporary upper-limit engine power Pelim obtained from the upper-limit engine power setting map, and a value obtained by subtracting the charging/discharging required power Pb* from the upper-limit engine power Pelim is set as the target engine power Pe*. Accordingly, when the accelerator required driving force Tda is greater than the upper-limit driving force Tdlim in charging/discharging the battery 50, the same target engine power Pe* as when the battery 50 is not charged/discharged is set and the engine 22 operates at the same operating point as when the battery 50 is not charged/discharged. As a result, it is possible to prevent the rotation speed Ne of the engine 22 from increasing or decreasing from the rotation speed (the target rotation speed Ne*) based on the vehicle speed V and the shift stage M due to charging/discharging of the battery 50.

In the hybrid vehicle 20 according to the first embodiment, the rotation speed correction base value Necorb is calculated on the basis of the engine rotation speed Ne of the engine 22, the rotation speed correction value reflection ratio kcor is calculated on the basis of the depression amount of the accelerator Acc and the shift stage M, and the rotation speed correction value Necor is calculated and set as a product of the rotation speed correction base value Necorb and the rotation speed correction value reflection ratio kcor. However, a relationship between the rotation speed Ne of the engine 22, the depression amount of the accelerator Acc, the shift stage M, and the rotation speed correction value Necor may be determined in advance and stored as a rotation speed correction value map, and when the rotation speed Ne of the engine 22, the depression amount of the accelerator Acc, and the shift stage M are given, the rotation speed correction value Necor may be set by deriving the corresponding rotation speed correction value Necor from the map.

In the hybrid vehicle 20 according to the first embodiment, the rotation speed correction value Necor is set to increase as the rotation speed Ne of the engine 22 decreases by setting the rotation speed correction base value Necorb to increase as the rotation speed Ne of the engine 22 decreases. However, a constant rotation speed correction base value Necorb may be set when the rotation speed Ne of the engine 22 is equal to or less than a predetermined rotation speed.

In the hybrid vehicle 20 according to the first embodiment, the rotation speed correction value Necor is set to have an increasing trend as the shift stage M becomes a higher-speed shift stage by setting the rotation speed correction value reflection ratio kcor to have an increasing trend as the shift stage M becomes a higher-speed shift stage. However, the rotation speed correction value Necor may be set regardless of the shift stage M.

In the hybrid vehicle 20 according to the first embodiment, the effective correction value Necor* is caused to reach the rotation speed correction value Necor by the rate limiting process using the rate value Nert which decreases as the temperature Tb of the battery 50 decreases. However, the effective correction value Necor* may be caused to reach the rotation speed correction value Necor by a rate limiting process using a rate value Nert which decreases as the absolute values of input and output limits Win and Wout of the battery 50 decrease. A slow changing process other than the rate limiting process may be used to cause the effective correction value Necor* to more slowly reach the rotation speed correction value Necor as the temperature Tb of the battery 50 decreases. In addition, the effective correction value Necor* may be caused to reach the rotation speed correction value Necor by a rate limiting process using a rate value Nert which is constant regardless of the temperature Tb of the battery 50 or the power storage ratio SOC. Alternatively, such a slow changing process such as the rate limiting process may not be used.

In the hybrid vehicle 20 according to the first embodiment, the power for outputting the smaller driving force of the accelerator required driving force Tda and the upper-limit driving force Tdlim to the drive shaft 36 is set as the target engine power Pe*. However, the target engine power Pe* may be set such that the smaller of power obtained by multiplying the accelerator required driving force Tda by the rotation speed Nd of the drive shaft 36 (Tda×Nd) and power obtained by multiplying the upper-limit driving force Tdlim by the rotation speed Nd of the drive shaft 36 (Tdlim×Nd) is output to the drive shaft 36. That is, Step S200 can be set to a process of comparing the power obtained by multiplying the accelerator required driving force Tda by the rotation speed Nd of the drive shaft 36 (Tda×Nd) with the power obtained by multiplying the upper-limit driving force Tdlim by the rotation speed Nd of the drive shaft 36 (Tdlim×Nd).

In the hybrid vehicle 20 according to the first embodiment, the mode switch 90 is provided and the drivability priority drive control routine illustrated in FIG. 2 is performed when the driving feeling priority mode is selected by the mode switch 90, but the drivability priority drive control routine illustrated in FIG. 2 may be performed as normal drive control without providing the mode switch 90.

Figure 12:
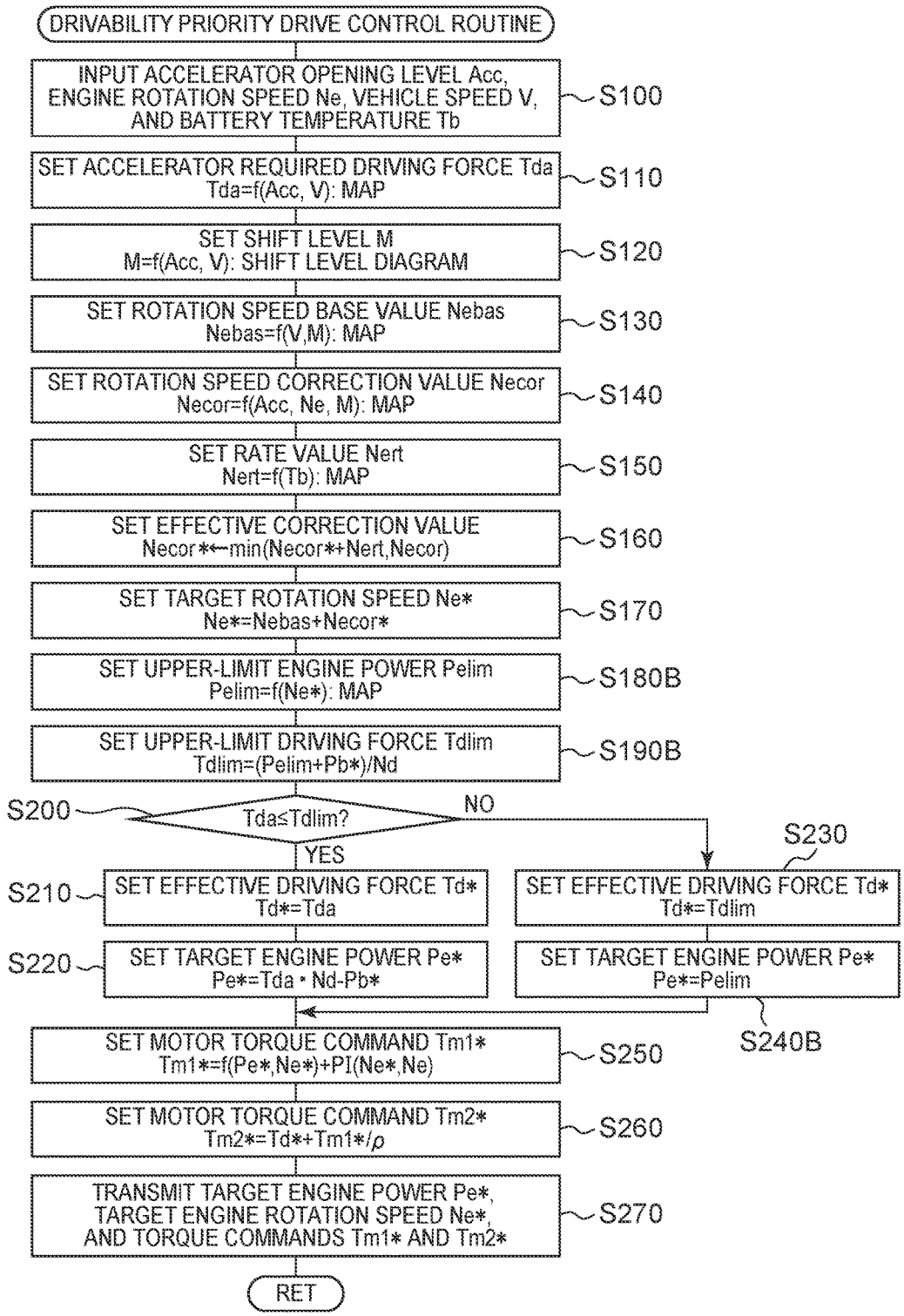
FIG. 12 is a flowchart illustrating a drivability priority drive control routine according to a modified example.

In the hybrid vehicle 20 according to the first embodiment, when the accelerator required driving force Tda is greater than the upper-limit driving force Tdlim in charging/discharging the battery 50, the upper-limit engine power Pelim is set by adding the charging/discharging required power Pb* to the temporary upper-limit engine power Pelim obtained from the upper-limit engine power setting map (Step S180), and a value obtained by subtracting the charging/discharging required power Pb* from the upper-limit engine power Pelim is set as the target engine power Pe* (Step S240). However, as described in the drivability priority drive control routine illustrated in FIG. 12, the temporary upper-limit engine power Pelim obtained by the upper-limit engine power setting map may be set as the upper-limit engine power Pelim (Step S180B), the upper-limit driving force Tdlim may be set by dividing a value, which is obtained by adding the charging/discharging required power Pb* to the upper-limit engine power Pelim, by the rotation speed Nd of the drive shaft 36 (Step S190B), and the upper-limit engine power Pelim may be set as the target engine power Pe* (Step S240B). Both routines are different in only whether to consider the charging/discharging required power Pb* in calculating the upper-limit engine power Pelim or whether to consider the charging/discharging required power Pb* in calculating the upper-limit driving force Tdlim and the results thereof are identical to each other.

Figure 13:
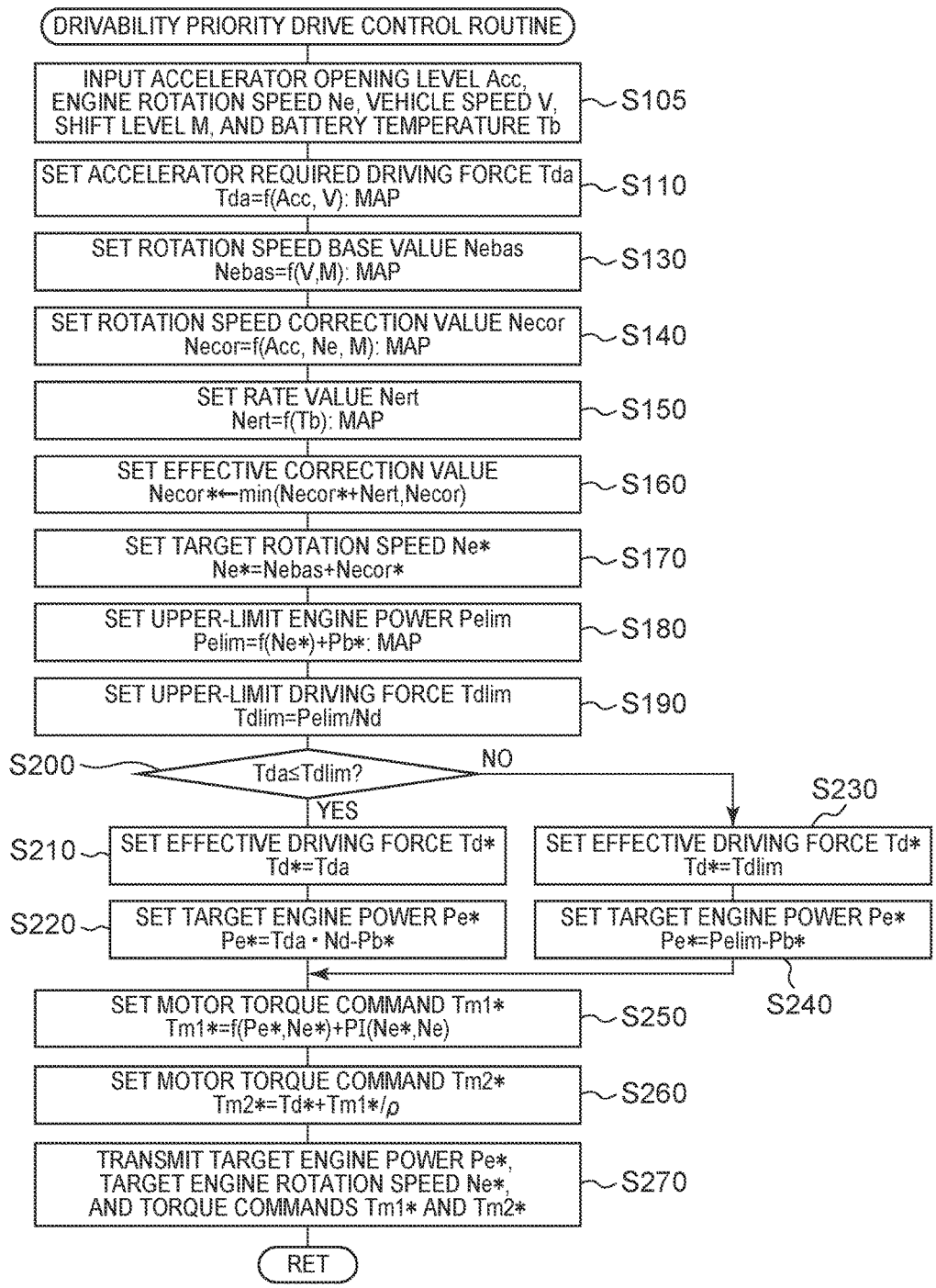
FIG. 13 is a flowchart illustrating an example of the drivability priority drive control routine which is performed by the HVECU 70 when an M position is set.

An operation when the shift position SP is the manual position (M position) in the hybrid vehicle 20 according to the first embodiment will be described below. In this case, the drivability priority drive control routine illustrated in FIG. 13 can be performed. The drivability priority drive control routine illustrated in FIG. 13 is the same as the drivability priority drive control routine illustrated in FIG. 2, except that the process (Step S105) of inputting the shift stage M as the shift position SP is added and the process of Step S120 of setting the shift stage M using the shift stage diagram illustrated in FIG. 6 is excluded. The drive control when the shift position SP is the manual position (M position) will be described below in brief using the drivability priority drive control routine illustrated in FIG. 13.

Figure 3:
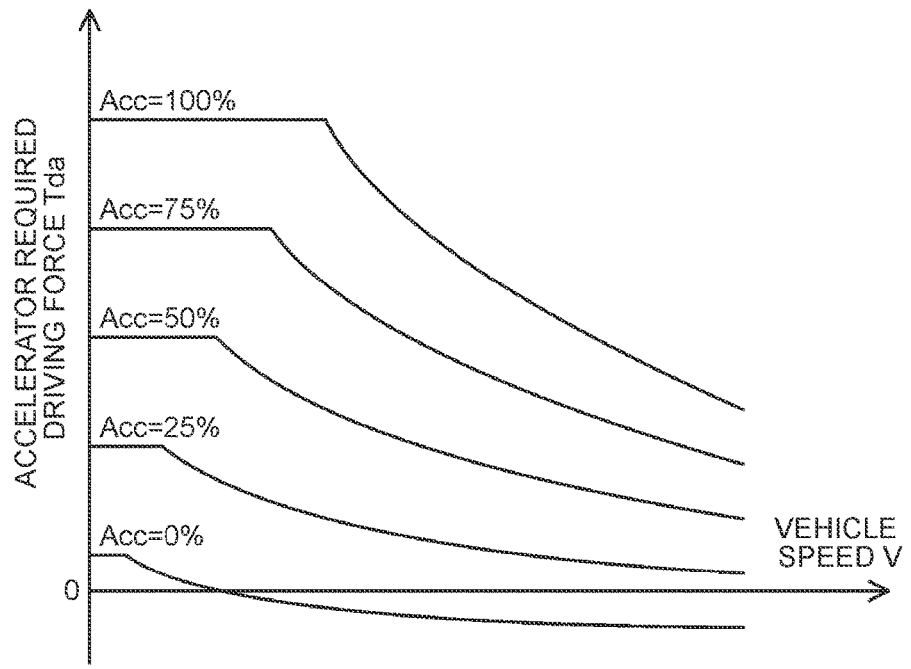
FIG. 3 is a diagram illustrating an example of an accelerator required driving force setting map.
Figure 4:
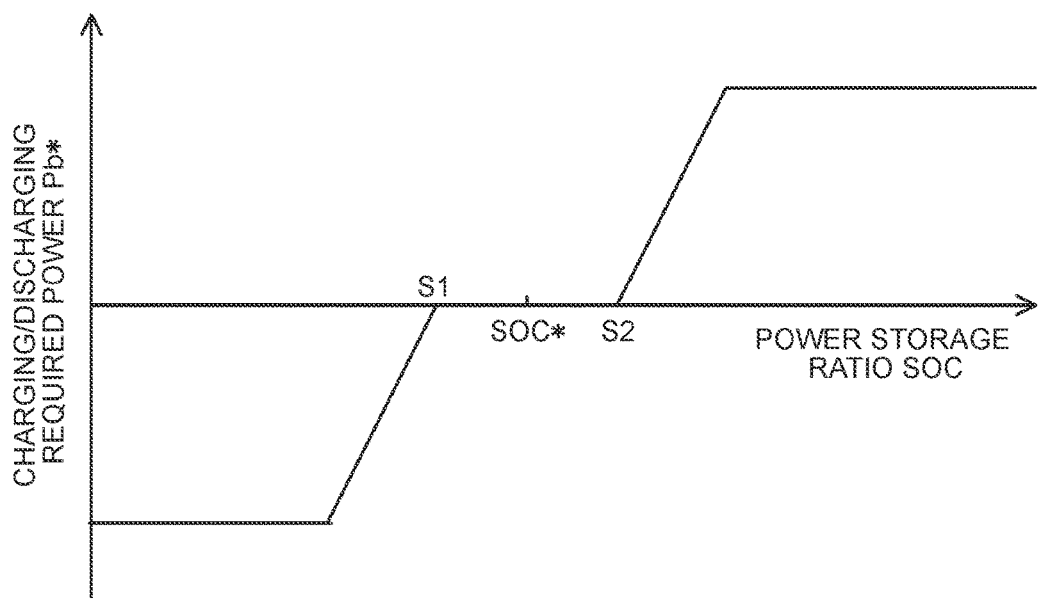
FIG. 4 is a diagram illustrating an example of a charging/discharging required power setting map.

When the drivability priority drive control routine illustrated in FIG. 13 is performed, the HVECU 70 first receives the depression amount of the accelerator Acc, the vehicle speed V, the shift stage M, the rotation speed Ne of the engine 22, and the battery temperature Tb (Step S105), and sets the accelerator required driving force Tda using the received depression amount of the accelerator Acc, the received vehicle speed V, and the accelerator required driving force setting map illustrated in FIG. 3 (Step S110). Subsequently, the HVECU 70 sets the rotation speed base value Nebas using the vehicle speed V, the shift stage M, and the rotation speed base value setting map illustrated in FIG. 7 (Step S130), and sets the rotation speed correction value Necor on the basis of the depression amount of the accelerator Acc, the rotation speed Ne of the engine 22, and the shift stage M using the relationship illustrated in FIG. 8 or the relationship illustrated in FIG. 9 (Step S140). Then, the HVECU 70 sets the rate value Nert using the temperature Tb of the battery 50 and the rate value setting map illustrated in FIG. 10 (Step S150), sets the smaller of the value obtained by adding the rate value Nert to the effective correction value Necor* and the rotation speed correction value Necor as a new effective correction value Necor* (Step S160), and sets the target rotation speed Ne* of the engine 22 to the sum of the rotation speed base value Nebas and the effective correction value Necor* (Step S170).

The upper-limit engine power Pelim is set by adding the charging/discharging required power Pb* to the temporary upper-limit engine power Pelim which is obtained using the target rotation speed Ne and the upper-limit engine power setting map illustrated in FIG. 11 (Step S180). The upper-limit driving force Tdlim is set by dividing the upper-limit engine power Pelim by the rotation speed Nd of the drive shaft 36 (Step S190), and the accelerator required driving force Tda is compared with the upper-limit driving force Tdlim (Step S200).

When the accelerator required driving force Tda is equal to or less than the upper-limit driving force Tdlim, the accelerator required driving force Tda is set as the effective driving force Td* (Step S210), and a value obtained by subtracting the charging/discharging required power Pb* from a value which is obtained by multiplying the accelerator required driving force Tda by the rotation speed Nd of the drive shaft 36 is set as the target engine power Pe* (Step S220). When the accelerator required driving force Tda is greater than the upper-limit driving force Tdlim, the upper-limit driving force Tdlim is set as the effective driving force Td* (Step S230) and a value obtained by subtracting the charging/discharging required power Pb* from the upper-limit engine power Pelim is set as the target engine power Pe* (Step S240).

Then, the torque command Tm1* of the motor MG1 is set using Expression (2) (Step S250) and the torque command Tm2* of the motor MG2 is set using Expression (3) (Step S260). The target engine power Pe* and the target engine rotation speed Ne* are transmitted to the engine ECU 24, the torque commands Tm1* and Tm2* are transmitted to the motor ECU 40 (Step S270), and the routine ends.

In the above-mentioned hybrid vehicle 20 according to the first embodiment, when the shift position SP is the manual position (M position), similarly to when the D position is set in the driving feeling priority mode, the target engine power Pe*, which is set such that the engine rotates 22 at the target rotation speed Ne* obtained by correcting the rotation speed base value Nebas based on the vehicle speed V and the shift stage M using the rotation speed correction value Necor based on the depression amount of the accelerator Acc, the rotation speed Ne, and the shift stage M and the smaller of the accelerator required driving force Tda set not in consideration of the shift stage M and the upper-limit driving force Tdlim set in consideration of the shift stage M is output to the drive shaft 36, is output from the engine 22 for the hybrid vehicle to travel. As a result, it is possible to give a better driving feeling to a driver and to prevent a driving force from becoming insufficient.

Figure 14:
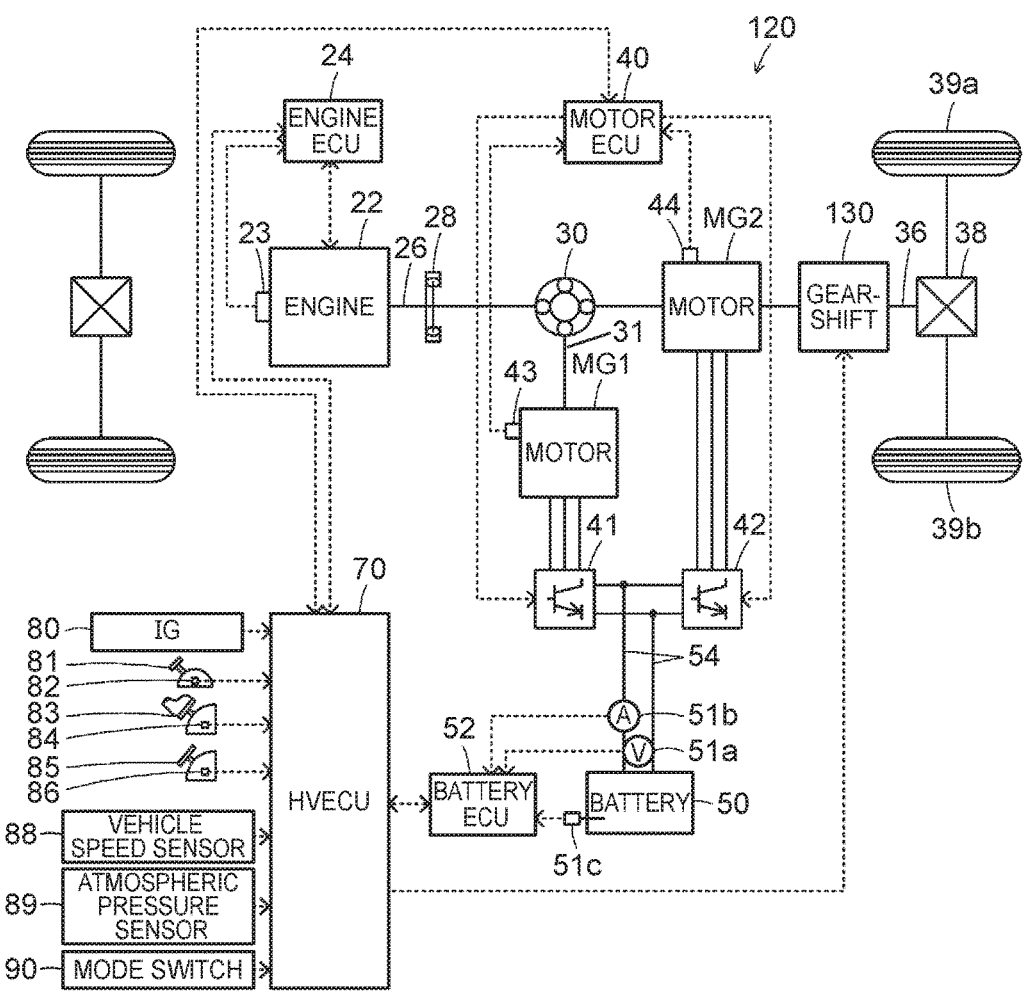
FIG. 14 is a diagram schematically illustrating a configuration of a hybrid vehicle 120 according to a second embodiment.

A hybrid vehicle 120 according to a second embodiment of the present disclosure will be described below. The configuration of the hybrid vehicle 120 according to the second embodiment is schematically illustrated in FIG. 14. The hybrid vehicle 120 according to the second embodiment has the same configuration as the hybrid vehicle 20 according to the first embodiment illustrated in FIG. 1, except that a gearshift 130 is provided as illustrated in FIG. 14. For the purpose of omission of repeated description, the same elements in the hybrid vehicle 120 according to the second embodiment as those in the hybrid vehicle 20 according to the first embodiment will be referenced by the same reference signs and detailed description thereof will not be made.

Figure 15:
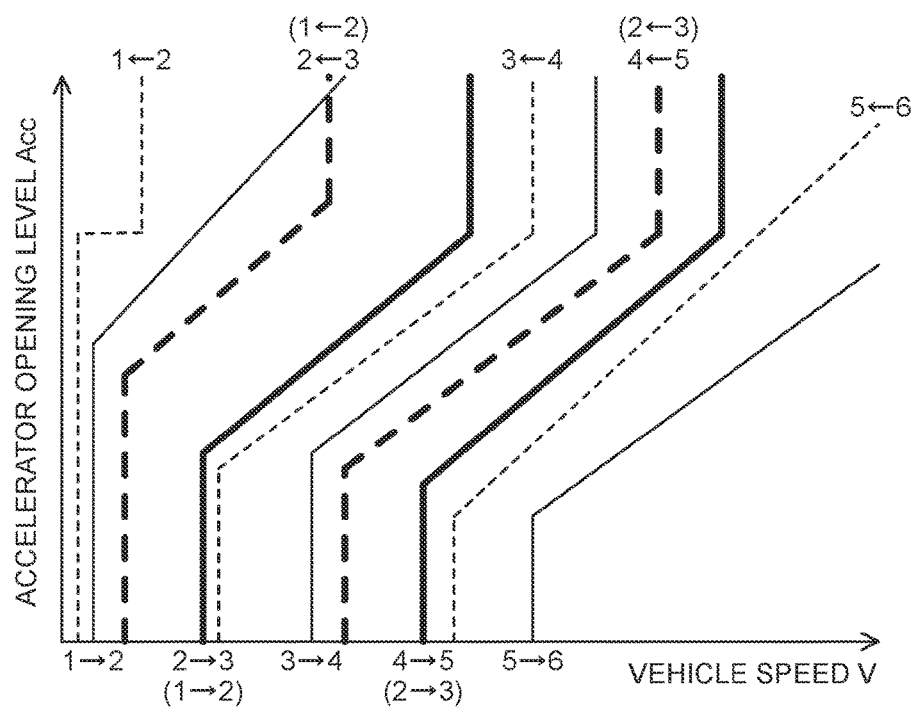
FIG. 15 is a diagram illustrating an example of a shift stage diagram which is used in the second embodiment.

The gearshift 130 included in the hybrid vehicle 120 according to the second embodiment is constituted by a stepped automatic gearshift of three shift stages in the driving direction which is hydraulically driven, and is shifted in accordance with a control signal from the HVECU 70. In the hybrid vehicle 120 according to the second embodiment, three virtual shift stages are set in addition to three shift stages of the gearshift 130 to constitute a gearshift of six shift stages. FIG. 15 illustrates an example of a shift stage diagram which is used in the second embodiment. For the purpose of easy comparison, the shift stage diagram illustrated in FIG. 15 is the same as the shift stage diagram illustrated in FIG. 6. In FIG. 15, thick solid lines denote upshift lines of the gearshift 130 and thick dotted lines denote downshift lines of the gearshift 130. Thin solid lines denote virtual upshift lines and thin dotted lines denote virtual downshift lines. In the drawing, numerals and arrows in the upper part and the lower part denote shifting in six shift stages including the virtual shift stages, and numerals and arrows in parentheses in the upper part and the lower part denote shifting in three shift stages of the gearshift 130. As illustrated in the drawing, one virtual shift stage is disposed between neighboring shift stages of the gearshift 130.

Figure 16:
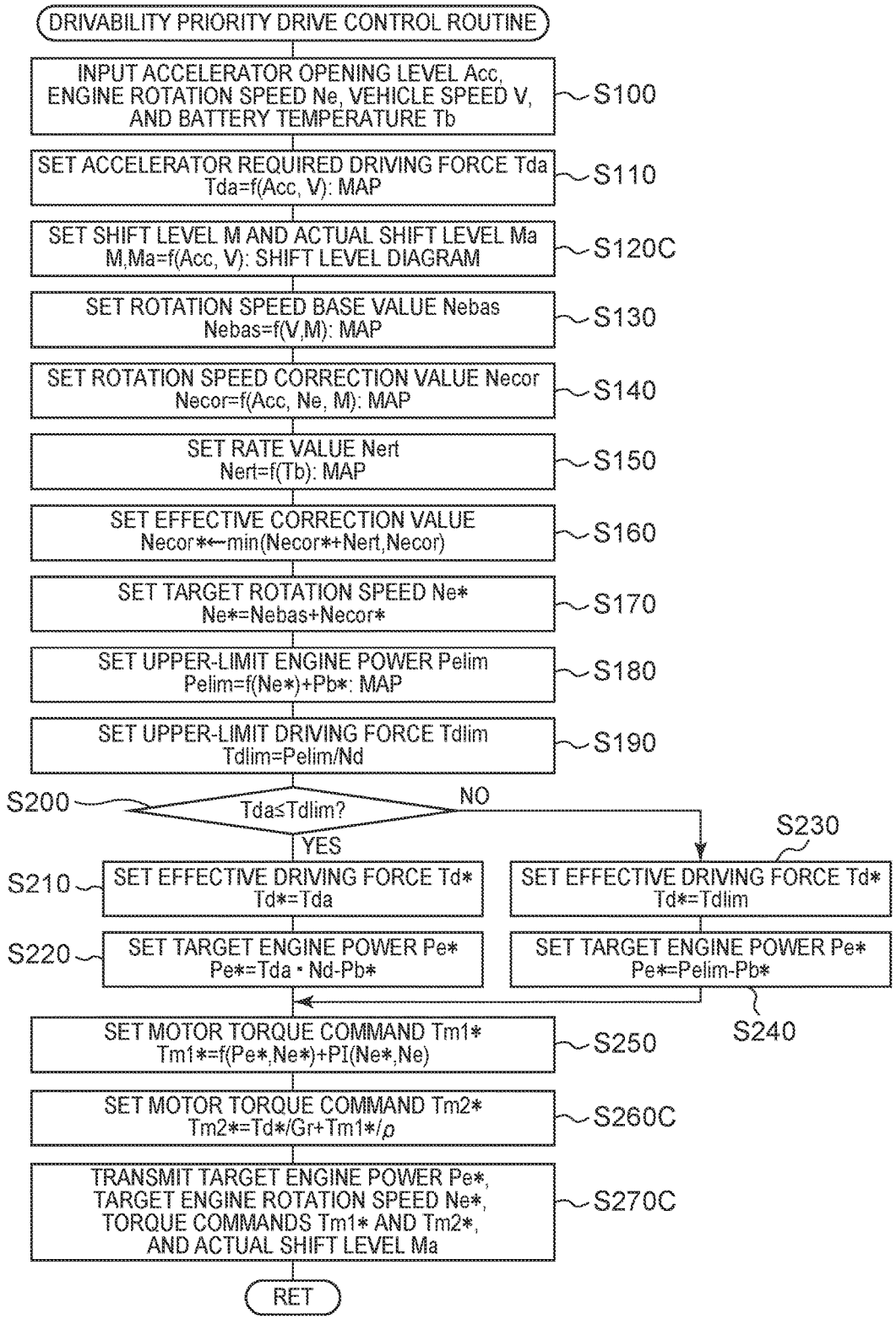
FIG. 16 is a flowchart illustrating an example of a drivability priority drive control routine which is performed by the HVECU 70 when a D position is set in a driving feeling priority mode in the second embodiment.

In the hybrid vehicle 120 according to the second embodiment, when the shift position is the D position in the driving feeling priority mode, the drivability priority drive control routine illustrated in FIG. 16 is performed. The drivability priority drive control routine illustrated in FIG. 16 is the same as the drivability priority drive control routine illustrated in FIG. 2, except for Step S120C of setting an actual shift stage Ma as well as the shift stage M, Step S260C of setting the torque command Tm2* of the motor MG2 using a gear ratio Gr of the actual shift stages Ma of the gearshift 130, and step S270C of transmitting the actual shift stage Ma to the gearshift 130 when transmitting the target engine power Pe* or the target engine rotation speed Ne*. Accordingly, the same processes in the drivability priority drive control routine illustrated in FIG. 16 as in the drivability priority drive control routine illustrated in FIG. 2 are referenced by the same step numbers. The drivability priority drive control routine illustrated in FIG. 16 will be described below in brief with a focus on differences from the drivability priority drive control routine illustrated in FIG. 2.

When the drivability priority drive control routine illustrated in FIG. 16 is performed, the HVECU 70 first receives the depression amount of the accelerator Acc, the vehicle speed V, the rotation speed Ne of the engine 22, and the battery temperature Tb (Step S100), and sets the accelerator required driving force Tda using the depression amount of the accelerator Acc, the vehicle speed V, and the accelerator required driving force setting map illustrated in FIG. 3 (Step S110). Subsequently, the shift stage M and the actual shift stage Ma are set using the depression amount of the accelerator Acc, the vehicle speed V, and the shift stage diagram illustrated in FIG. 14 (Step S120C). Here, the shift stage M means the six shift stages including the virtual shift stages, and the actual shift stage Ma means the three shift stages of the gearshift 130. Accordingly, the shift stage M is set to correspond to any one of the six shift stages on the basis of all shift stage lines in FIG. 14, and the actual shift stage Ma is set to correspond to any one of the three shift stages on the basis of the thick solid line and the thick dotted line in FIG. 14.

Subsequently, the rotation speed base value Nebas is set using the vehicle speed V, the shift stage M, and the rotation speed base value setting map illustrated in FIG. 7 (Step S130), and the rotation speed correction value Necor is set on the basis of the depression amount of the accelerator Acc, the rotation speed Ne of the engine 22, and the shift stage M using the relationship illustrated in FIG. 8 or the relationship illustrated in FIG. 9 (Step S140). Then, the HVECU 70 sets the rate value Nert using the temperature Tb of the battery 50 and the rate value setting map illustrated in FIG. 10 (Step S150), sets the smaller of the value obtained by adding the rate value Nert to the effective correction value Necor* and the rotation speed correction value Necor as a new effective correction value Necor* (Step S160), and sets the target rotation speed Ne* of the engine 22 to the sum of the rotation speed base value Nebas and the effective correction value Necor* (Step S170).

The upper-limit engine power Pelim is set by adding the charging/discharging required power Pb* to the temporary upper-limit engine power Pelim which is obtained using the target rotation speed Ne and the upper-limit engine power setting map illustrated in FIG. 11 (Step S180). The upper-limit driving force Tdlim is set by dividing the upper-limit engine power Pelim by the rotation speed Nd of the drive shaft 36 (Step S190), and the accelerator required driving force Tda is compared with the upper-limit driving force Tdlim (Step S200).

When the accelerator required driving force Tda is equal to or less than the upper-limit driving force Tdlim, the accelerator required driving force Tda is set as the effective driving force Td* (Step S210), and a value obtained by subtracting the charging/discharging required power Pb* from a value which is obtained by multiplying the accelerator required driving force Tda by the rotation speed Nd of the drive shaft 36 is set as the target engine power Pe* (Step S220). When the accelerator required driving force Tda is greater than the upper-limit driving force Tdlim, the upper-limit driving force Tdlim is set as the effective driving force Td* (Step S230) and a value obtained by subtracting the charging/discharging required power Pb* from the upper-limit engine power Pelim is set as the target engine power Pe* (Step S240).

Then, the torque command Tm1* of the motor MG1 is set using Expression (2) (Step S250) and the torque command Tm2* of the motor MG2 is set using Expression (5) (Step S260C). In Expression (5), "Gr" denotes a gear ratio of the actual shift stage Ma of the gearshift 130. Accordingly, the first term on the right side of Expression (5) means a driving force to be output to an input shaft of the gearshift 130 so as to output the effective driving force Td* to the drive shaft 36 which is an output shaft of the gearshift 130.

$$Tm2^*=Td^*/Gr+Tm1^*/\rho \qquad (5)$$

The target engine power Pe* and the target engine rotation speed Ne* are transmitted to the engine ECU 24, the torque commands Tm1* and Tm2* are transmitted to the motor ECU 40, the actual shift stage Ma is transmitted to the gearshift 130 (Step S270C), and the routine ends. The gearshift 130 receiving the actual shift stage Ma maintains the shift stage when the shift stage is an actual shift stage Ma, and shifts such that the shift stage is an actual shift stage Ma when the shift stage is not an actual shift stage Ma.

Since the above-mentioned hybrid vehicle 120 according to the second embodiment functions in the same manner as the hybrid vehicle 20 according to the first embodiment, the same advantages as achieved in the hybrid vehicle 20 according to the first embodiment can be achieved. That is, even when the driver steps on the accelerator pedal 83, it is possible to drive the engine 22 at the engine rotation speed Ne based on the vehicle speed V and to give a better driving feeling to the driver in comparison with a case in which the rotation speed Ne of the engine 22 increases rapidly before the vehicle speed V increases. When the shift stage M is changed (shifted), the target engine power Pe* based on the shift stage M also changes and it is thus possible to give a feeling of a change in speed to the driver. As a result, it is possible to give a good driving feeling to the driver. Since the target rotation speed Ne* of the engine 22 is set by setting the rotation speed correction value Necor to have an increasing trend as the depression amount of the accelerator Acc increases, it is possible to set a higher target rotation speed Ne* in comparison with a case in which the target rotation speed Ne* of the engine 22 is set regardless of the depression amount of the accelerator Acc and to prevent the driving force to be output to the drive shaft 36 from becoming insufficient by increasing the power capable of being output from the engine 22.

Figure 17:
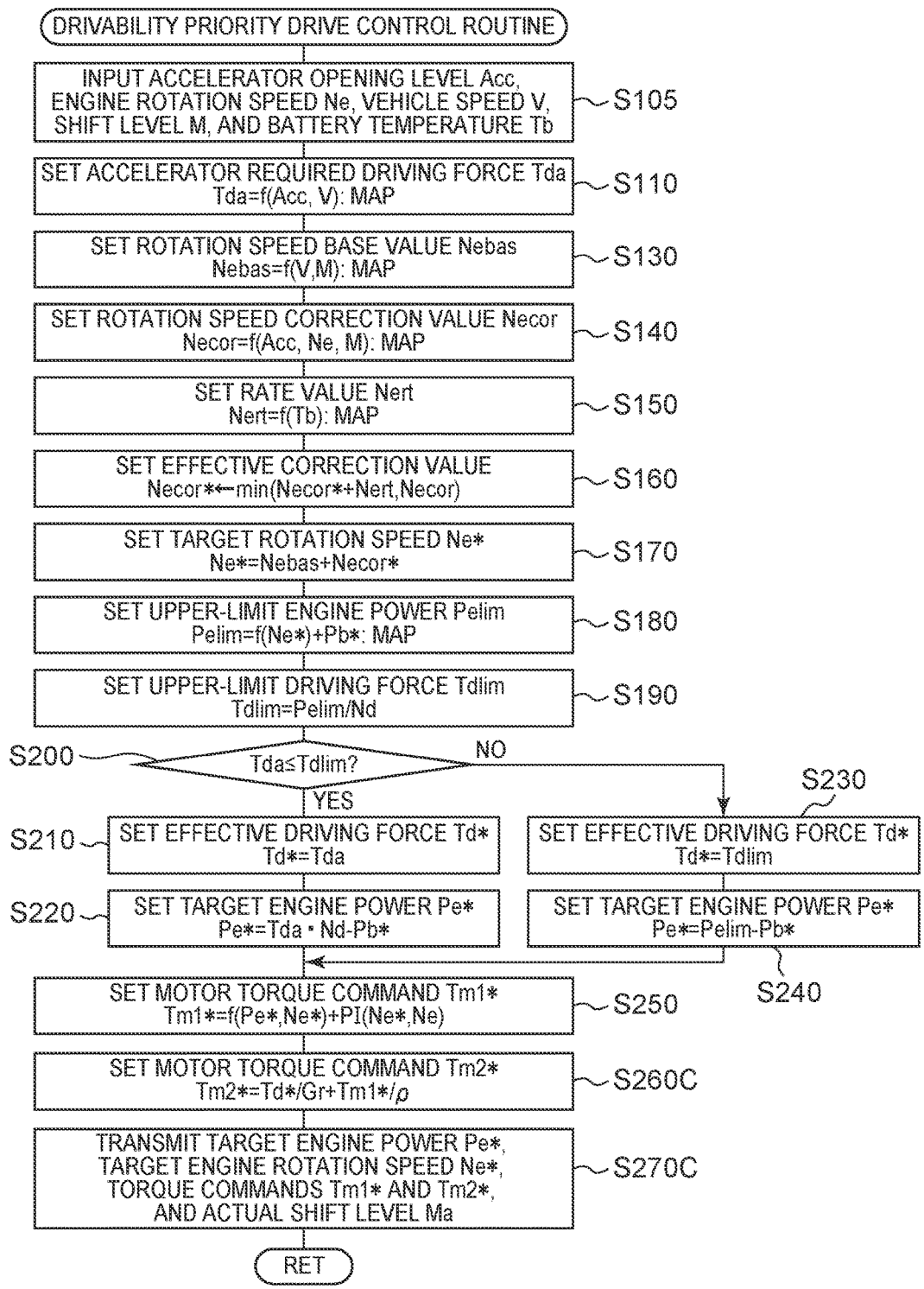
FIG. 17 is a flowchart illustrating an example of the drivability priority drive control routine which is performed by the HVECU 70 when an M position is set in the second embodiment.

An operation when the shift position SP is the manual position (M position) in the hybrid vehicle 120 according to the second embodiment will be described below. In this case, the drivability priority drive control routine illustrated in FIG. 17 can be performed. The drivability priority drive control routine illustrated in FIG. 17 is the same as the drivability priority drive control routine illustrated in FIG. 13, except for Step S260C of setting the torque command Tm2* of the motor MG2 using the gear ratio Gr of the actual shift stages Ma of the gearshift 130 and Step S270C of transmitting the actual shift stage Ma to the gearshift 130 when transmitting the target engine power Pe*, the target engine rotation speed Ne*, or the like. The differences are the same as described in the drivability priority drive control routine illustrated in FIG. 14 and thus description thereof will not be repeated.

In the hybrid vehicle 120 according to the second embodiment, the gearshift 130 of three shift stages is provided to constitute six shift stages including the virtual shift stages, but the gearshift 130 is not limited to the three shift stages and may have two shift stages or may have four or more shift stages. One virtual shift stage is disposed between neighboring shift stages of the gearshift, but a desired number of virtual shift stages such as one shift stage or two shift stages may be disposed in each shift stage of the gearshift or a desired number of virtual shift stages may be disposed in only a specific shift stage of the gearshift. The virtual shift stages may not be provided.

Correspondences between principal elements in the embodiments and principal elements of the present disclosure described in "SUMMARY" will be described below. In the embodiments, the engine 22 corresponds to the "engine," the motor MG1 corresponds to the "first motor," the drive shaft 36 corresponds to the "drive shaft," the planetary gear 30 corresponds to the "planetary gear mechanism," the motor MG2 corresponds to the "second motor," and the battery 50 corresponds to the "battery." The HVECU 70, the engine ECU 24, and the motor ECU 40 that perform drive control in the normal driving mode or the drivability priority drive control routine illustrated in FIG. 2 correspond to the "electronic control unit."

The correspondences between principal elements in the embodiments and principal elements of the present disclosure described in "SUMMARY" do not limit the elements of the present disclosure described in the "SUMMARY", because the embodiments are an example for specifically describing the aspects for putting the present disclosure described in the "SUMMARY" into practice. That is, analysis of the present disclosure described in the "SUMMARY" has to be performed on the basis of description thereof, and the embodiments are only a specific example of the present disclosure described in the "SUMMARY".

While aspects of the present disclosure have been described above with reference to the embodiments, the present disclosure is not limited to the embodiments and can be modified in various forms without departing from the gist of the present disclosure.

The present disclosure is applicable to the industry of manufacturing a hybrid vehicle.

What is claimed is:
1. A hybrid vehicle comprising:
an engine;
a first motor;
a planetary gear mechanism connected to an output shaft of the engine, a rotary shaft of the first motor, and a drive shaft, respectively;
a second motor connected to the drive shaft and configured to input and output power to and from the drive shaft;
a battery configured to exchange electric power with the first motor and the second motor; and
an electronic control unit configured to:
set a required driving force to be output to the drive shaft on a basis of a depression amount of an accelerator pedal by a driver and a vehicle speed;

control the engine, the first motor, and the second motor such that the hybrid vehicle travels using the required driving force;
set a target rotation speed on a basis of the depression amount of the accelerator pedal, the vehicle speed, and a shift stage such that the target rotation speed of the engine increases as the depression amount of the accelerator pedal increases;
set an upper-limit driving force, the upper-limit driving force being maximum power capable of being output from the engine when the engine operates at the target rotation speed; and
control the engine, the first motor, and the second motor such that the engine operates at the target rotation speed and the smaller driving force of the upper-limit driving force and the required driving force is output to the drive shaft.

2. The hybrid vehicle according to claim 1, wherein the electronic control unit is configured to set a rotation speed base value of the engine on the basis of the vehicle speed and the shift stage,
the electronic control unit is configured to set a rotation speed correction value such that the rotation speed correction value increases as the depression amount of the accelerator pedal increases, and
the electronic control unit is configured to set the target rotation speed by correcting the rotation speed base value using the rotation speed correction value.

3. The hybrid vehicle according to claim 2, wherein the electronic control unit is configured to set the rotation speed correction value such that the rotation speed correction value is greater when the shift stage is a high-speed level than when the shift stage is a low-speed level.

4. The hybrid vehicle according to claim 2, wherein the electronic control unit is configured to set the rotation speed correction value such that the rotation speed correction value is greater when the rotation speed of the engine is at a first speed than when the rotation speed of the engine is at a second speed that is greater than the first speed.

5. The hybrid vehicle according to claim 2, wherein the electronic control unit is configured to set the target rotation speed such that a rate of change of the target rotation speed decreases when a temperature of the battery decreases when the rotation speed of the engine increases by setting the rotation speed correction value.

6. The hybrid vehicle according to claim 1, wherein the electronic control unit is configured to set the shift stage on a basis of the depression amount of the accelerator pedal and the vehicle speed or on the basis of a driver's shifting operation.

7. The hybrid vehicle according to claim 1, wherein the shift stage is a virtual shift stage.

8. The hybrid vehicle according to claim 1, further comprising a stepped gearshift attached between the drive shaft and the planetary gear mechanism,
wherein the shift stage is a shift stage of the stepped gearshift or a shift stage obtained by adding a virtual shift stage to the shift stage of the stepped gearshift.

* * * * *

UNITED STATES PATENT AND TRADEMARK OFFICE
CERTIFICATE OF CORRECTION

PATENT NO. : 10,279,794 B2  
APPLICATION NO. : 15/595301  
DATED : May 7, 2019  
INVENTOR(S) : Shunya Kato and Masaya Sugai Page 1 of 1

It is certified that error appears in the above-identified patent and that said Letters Patent is hereby corrected as shown below:

In the Specification

In Column 12, Line 9, delete "Neil", insert --Nert--, therefor.

Signed and Sealed this  
Thirty-first Day of December, 2019

Andrei Iancu  
*Director of the United States Patent and Trademark Office*